US009002106B2

(12) United States Patent
Ihara

(10) Patent No.: US 9,002,106 B2
(45) Date of Patent: Apr. 7, 2015

(54) IMAGE PROCESSING APPARATUS, IMAGE PROCESSING METHOD, AND STORAGE MEDIUM

(71) Applicant: Fuji Xerox Co., Ltd., Minato-ku, Tokyo (JP)

(72) Inventor: Fujio Ihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 78 days.

(21) Appl. No.: 13/902,489

(22) Filed: May 24, 2013

(65) Prior Publication Data
US 2014/0126811 A1 May 8, 2014

(30) Foreign Application Priority Data

Nov. 2, 2012 (JP) ................................. 2012-242508

(51) Int. Cl.
G06K 9/00 (2006.01)
G06K 9/46 (2006.01)
G06K 9/32 (2006.01)
G06K 9/36 (2006.01)

(52) U.S. Cl.
CPC .............. G06K 9/4604 (2013.01); G06K 9/32 (2013.01); *G06K 2009/363* (2013.01)

(58) Field of Classification Search
CPC .................................................... G06K 9/4604
USPC ................... 382/165, 199, 266, 276
See application file for complete search history.

(56) References Cited

U.S. PATENT DOCUMENTS

| 7,171,056 | B2 * | 1/2007 | Zhang et al. ................... 382/276 |
| 8,057,049 | B2 * | 11/2011 | Nikaido ........................... 353/69 |
| 8,120,665 | B2 * | 2/2012 | Maruyama et al. ......... 348/222.1 |
| 8,731,321 | B2 * | 5/2014 | Fujiwara et al. .............. 382/266 |
| 2005/0078192 | A1 * | 4/2005 | Sakurai et al. ........... 348/207.99 |
| 2009/0225180 | A1 * | 9/2009 | Maruyama et al. ........ 348/222.1 |
| 2009/0263023 | A1 * | 10/2009 | Iwamoto ....................... 382/199 |
| 2013/0121595 | A1 * | 5/2013 | Kawatani et al. ............. 382/199 |
| 2014/0126811 | A1 * | 5/2014 | Ihara ............................ 382/165 |

FOREIGN PATENT DOCUMENTS

| JP | 2006-048626 A | 2/2006 |
| JP | 2012-014430 A | 1/2012 |

* cited by examiner

*Primary Examiner* — Gregory M Desire
(74) *Attorney, Agent, or Firm* — Sughrue Mion, PLLC

(57) ABSTRACT

An image processing apparatus detects boundaries from an image; extracts straight-line segments from the boundaries; detects a region where differences between pixel values of near pixels located across the segments are larger than, or at least a predetermined first value; classifies the segments in the region into four sides of quadrangles; detects colors or densities in outer areas of the four sides; selects combinations that differences between the colors or the densities corresponding to the segments in the combinations are no more than, or smaller than a predetermined second value, from the combinations of the four sides that possibly form the quadrangles; detects coordinates of four vertexes obtained when the segments in the combinations are extended, and a combination that an area of a quadrangle formed by the corresponding four coordinates satisfies a predetermined condition; and corrects the quadrangle formed by the combination to a rectangle.

8 Claims, 21 Drawing Sheets

IMAGE PROCESSING APPARATUS, IMAGE PROCESSING METHOD, AND STORAGE MEDIUM

CROSS-REFERENCE TO RELATED APPLICATIONS

This application is based on and claims priority under 35 USC 119 from Japanese Patent Application No. 2012-242508 filed Nov. 2, 2012.

BACKGROUND

The present invention relates to an image processing apparatus, an image processing method, and a storage medium.

SUMMARY

According to an aspect of the invention, there is provided an image processing apparatus including a first detection unit that detects boundaries from an image; an extraction unit that extracts straight-line segments from the boundaries detected by the first detection unit; a second detection unit that detects a region in which differences between pixel values of near pixels located across the straight-line segments extracted by the extraction unit are larger than a predetermined first value, or equal to or larger than the predetermined first value; a classification unit that classifies the straight-line segments in the region detected by the second detection unit into four sides of quadrangles; a third detection unit that detects colors or densities in outer areas of the four sides classified by the classification unit; a selection unit that selects combinations that differences between the colors or the densities detected by the third detection unit and corresponding to the straight-line segments in the combinations are equal to or smaller than a predetermined second value, or smaller than the predetermined second value, from the combinations of the four sides that possibly form the quadrangles; a fourth detection unit that detects coordinates of four vertexes obtained when the straight-line segments in the combinations are extended, and a combination that an area of a quadrangle formed by the corresponding four coordinates satisfies a predetermined condition, from the combinations selected by the selection unit; and a correction unit that corrects the quadrangle formed by the combination detected by the fourth detection unit to a rectangle.

BRIEF DESCRIPTION OF THE DRAWINGS

Exemplary embodiments of the present invention will be described in detail based on the following figures, wherein.

DETAILED DESCRIPTION

Figure 29A:
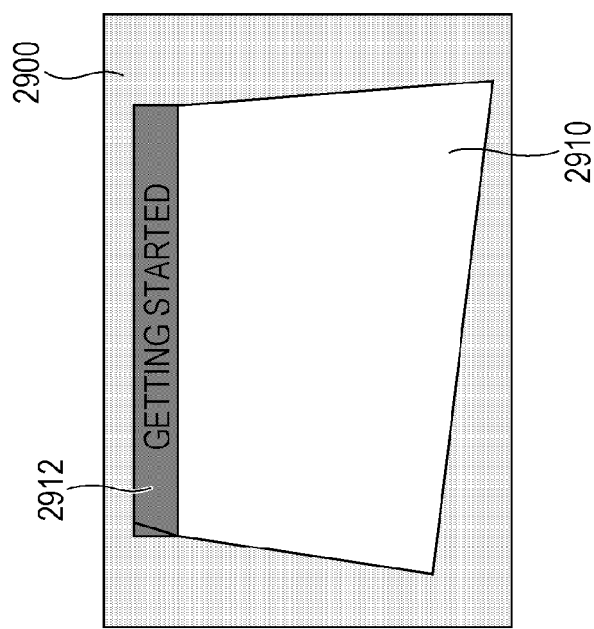
FIGS. 29A and 29B are explanatory views showing an example of a project distortion that occurs when an image of a document or the like is captured.
Figure 29B:
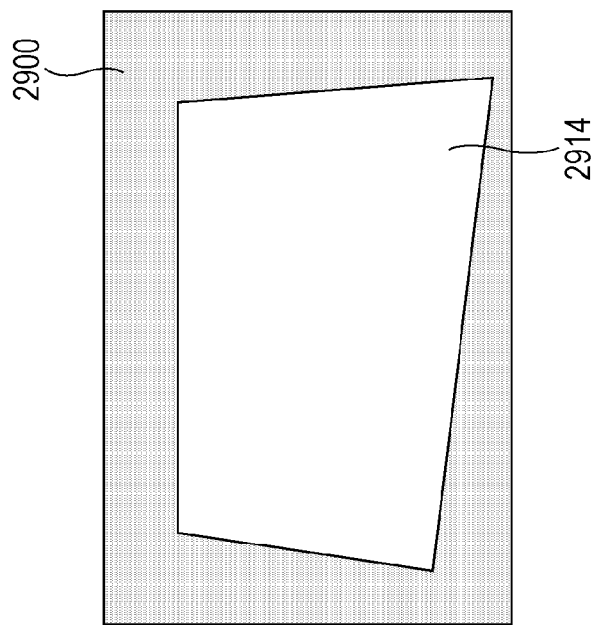

Prior to explanation of an exemplary embodiment, a basic technique is described with reference to FIGS. 29A and 29B. This explanation is provided for easier understanding of an exemplary embodiment.

When an image of a rectangular subject, such as a document or a whiteboard, is captured by a camera, a projective distortion may occur. An image capture device may capture an image of a document, which is placed on a document table by a user, by a camera, store image data of the document captured by the camera and execute image processing, and enlarge and project the image of the document on a screen by a projector. The image processing may correct a projective distortion to an original rectangle. Processing for extracting a quadrangle having the projective distortion may be, for example, a technique that detects straight-line components from the image data, and when the technique extracts four lines that form a rectangle from the straight-line components, the technique selects four lines that directions of gradients of the four lines are not the same in one of directions toward an inner side and an outer side. Also, there is a technique that captures an image of a document or the like while being placed on a base, and obtains four sides of the document by using a difference between an image of only the base, which has been previously captured, and the image with the document.

These techniques may be basically applied to a whiteboard or a document with a simple layout. However, for example, as a document image 2910 shown in FIG. 29A, the document image 2910 having a title 2912 with a color in the entire region of its periphery may be a subject of the technique. In this case, the document image 2910 including the tile 2912 may not be detected from an image 2900. As shown in FIG. 29B, a document image (portion) 2914 may be detected from the image 2900. The document image (portion) 2914 may be unintentionally corrected.

Various exemplary embodiments desirable for implementing the present invention are described below with reference to the drawings.

First Exemplary Embodiment

Figure 1:
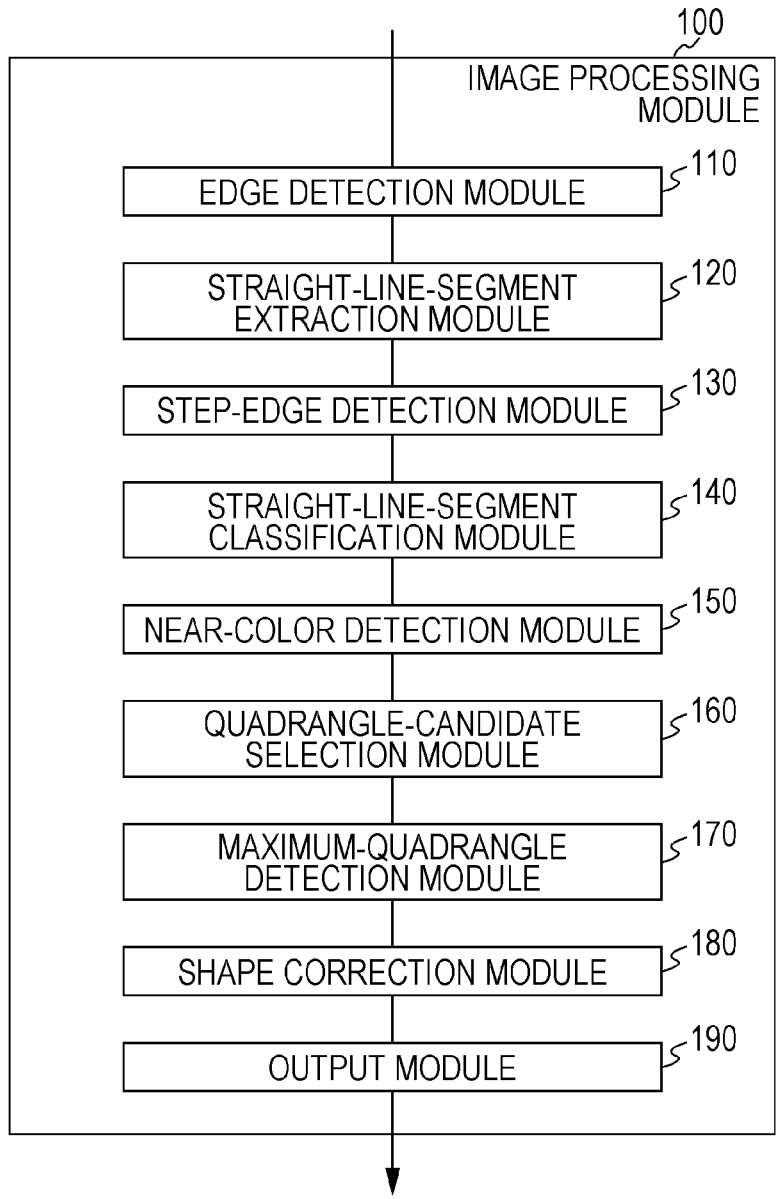
FIG. 1 is a conceptual module configuration diagram for a configuration example according to a first exemplary embodiment.

FIG. 1 is a conceptual module configuration diagram for a configuration example according to a first exemplary embodiment.

A module represents a part such as software (a computer program), hardware, etc., which may be typically theoretically separated. Hence, the module in any of the exemplary embodiments is not limited to a module in a computer program, and also indicates a module in a hardware configuration. Therefore, the exemplary embodiment also describes a computer program (a program that causes a computer to execute procedures, a program that causes the computer to function as units), a program that causes the computer to provide the functions), a system, and a method. In the explanation, the wordings "store," "be caused to store," and the equivalent wording are used. When an exemplary embodiment is for a computer program, the wordings represent "cause a storage device to store," or "control a storage device to store." Also, a module may correspond to a function one by one. However, when being mounted, one module may be formed of one program, plural modules may be formed of one program, or one module may be formed of plural programs. Also, plural modules may be executed by one computer, or one module may be executed by plural computers in distributed environment or parallel environment. One module may include another module. Also, in the following explanation, the wording "connection" may be used for physical connection and logical connection (transmission and reception of data, instructions, reference relationship among data, etc.). The wording "predetermined" represents that a value is determined before subject processing. In addition to a situation before processing according to an exemplary embodiment is started, even after the processing according to the exemplary embodiment is started, as long as the situation is before the subject processing, a value is determined in accordance with a state and a condition at a current timing, or a state and a condition up to the current timing. If there are plural "predetermined values," the values may be different from each other, or two or more values (of course, even all values) may be equivalent. Also, the expression "if A, B is executed" represents that "it is determined whether A or not, and if A, B is executed," unless otherwise the determination whether A or not is not required.

Also, a system or an apparatus may be formed by connecting plural computers, hardware, devices, etc., through a communication measure such as a network (including communication connection of one by one correspondence), or may be formed with one computer, hardware, device, etc. An "apparatus" and a "system" are used as equivalent words. Of course, the "system" does not include a mere "social scheme" (social system) that is a man-made rule.

Also, subject information is read from a storage device every processing by each module or every processing if plural steps of processing are executed in a module, and after the processing, a processing result is written in the storage device. Hence, explanation for reading from the storage device before the processing and writing in the storage device after the processing may be occasionally omitted. The storage device mentioned here may include a hard disk, a random access memory (RAM), an external storage medium, a storage device through a communication line, and a register in a central processing unit (CPU).

An image processing apparatus according to the first exemplary embodiment corrects an image having a projective distortion. As shown in an example of FIG. 1, an image processing module 100 includes an edge detection module 110, a straight-line-segment extraction module 120, a step-edge detection module 130, a straight-line-segment classification module 140, a near-color detection module 150, a quadrangle-candidate selection module 160, a maximum-quadrangle detection module 170, a shape correction module 180, and an output module 190.

The edge detection module 110 is connected to the straight-line-segment extraction module 120. The edge detection module 110 detects boundaries (which are called edges or outlines, and hereinafter also referred to as edges) from an image. In the image, a rectangular (quadrangular (including square)) document, a whiteboard, etc., is captured, and a projective distortion occurs at the rectangle. The document, whiteboard, etc., is exemplified here; however, any subject may be applied as long as the external shape of the subject is rectangular. Also, reception of the subject image includes, for example, reading an image by using a scanner or a camera (including a camera the position of which is fixed with respect to a subject, a digital camera that is operated by a user, and a cellular phone equipped with a camera), receiving an image from an external device by using a facsimile or the like through a communication line, and reading an image that is stored in a hard disk (including a configuration that is installed in a computer, or a configuration that is connected through a network). The image may be a binary image or a multi-level image (including a color image). The image to be received may be one image or plural images. Also, the content of the image may be a document used for business, a pamphlet for advertisement, or a whiteboard or the like used for a meeting.

The method of detecting the boundaries may use an existing technique called edge detection. For example, edge portions with a predetermined intensity or higher are detected by using a Sobel filter or the like that is a differential filter.

The straight-line-segment extraction module 120 is connected to the edge detection module 110 and the step-edge detection module 130. The straight-line-segment extraction module 120 extracts straight-line segments from the boundaries detected by the edge detection module 110. For example, the straight-line-segment extraction module 120 detects edges close in shape to straight lines, and obtains an inclination and positional information for a start point and a terminal point of each edge. The straight-line-segment extraction module 120 may eliminate a straight-line segment with a predetermined length or smaller. The detail will be described later with reference to FIGS. 6 to 8.

The step-edge detection module 130 is connected to the straight-line-segment extraction module 120 and the straight-line-segment classification module 140. The step-edge detection module 130 detects a region (hereinafter, also referred to as step-edge region) in which differences between pixel values of near pixels located across the straight-line segments extracted by the straight-line-segment extraction module 120 are larger than a predetermined first value, or equal to or larger than the predetermined first value. The "differences between the pixel values of the near pixels located across the straight-line segments" are each a difference between pixel values of pixels located within a predetermined distance from a straight-line segment in a plane that is divided into one plane and the other plane by the straight-line segment, the pixels being located in the one plane and the other plane. For example, only a straight-line segment, the corresponding edge of which is step type, is extracted from the straight-line segments extracted by the straight-line-segment extraction module 120. The detail will be described later with reference to FIGS. 9A to 9D.

The straight-line-segment classification module 140 is connected to the step-edge detection module 130 and the near-color detection module 150. The straight-line-segment classification module 140 classifies the straight-line segments in the region detected by the step-edge detection module 130 into four sides of quadrangles. For example, the straight-line segments are classified into an upper-side candidate, a lower-side candidate, a left-side candidate, and a right-side candidate. The detail will be described later with reference to FIGS. 10 to 12.

The near-color detection module 150 is connected to the straight-line-segment classification module 140 and the quadrangle-candidate selection module 160. The near-color detection module 150 detects colors or densities in outer areas of the four sides classified by the straight-line-segment classification module 140. For example, the near-color detection module 150 measures and holds the colors or the densities in the outer areas of the upper-side, lower-side, left-side, and right-side candidates, or in areas near ends of the image. The detail will be described later with reference to FIGS. 13 and 14.

The quadrangle-candidate selection module 160 is connected to the near-color detection module 150 and the maximum-quadrangle detection module 170. The quadrangle-candidate selection module 160 selects combinations (quadrangles) that differences between the colors or the densities detected by the near-color detection module 150 and corresponding to the straight-line segments in the combinations are equal to or smaller than a predetermined second value, or smaller than the predetermined second value, from the combinations of four sides that possibly form quadrangles. The "differences between the colors or the densities" each represent a difference between colors or densities in a combination. For example, the quadrangle-candidate selection module 160 selects only combinations with near colors being close, from combinations of all the upper-side, lower-side, left-side, and right-side candidates. The state in which near colors are close represents that a distance between near colors calculated in a certain color space is a predetermined value or smaller. The detail will be described later with reference to FIGS. 15 and 16.

The maximum-quadrangle detection module 170 is connected to the quadrangle-candidate selection module 160 and the shape correction module 180. The maximum-quadrangle detection module 170 detects coordinates of four vertexes obtained when the straight-line segments in the combinations are extended, and a combination that the area of a quadrangle formed by the corresponding four coordinates satisfies a predetermined condition, from the combinations selected by the quadrangle-candidate selection module 160. For example, the maximum-quadrangle detection module 170 obtains coordinates of four vertexes obtained when four line segments are extended, and a combination that the area of a quadrangle formed by corresponding four coordinates is a maximum area, from plural four-line-segment combinations output by the quadrangle-candidate selection module 160. The state in which the "area satisfies the predetermined condition" includes a quadrangle with the maximum area, and a quadrangle with an area having a predetermined ratio and more to the image. Hereinafter, an example in which the area is the maximum is described.

The shape correction module 180 is connected to the maximum-quadrangle detection module 170 and the output module 190. The shape correction module 180 corrects a quadrangle formed of the combination detected by the maximum-quadrangle detection module 170. For example, project transform is executed so that the coordinates of the four vertexes of the quadrangle with the maximum area meet four vertexes of a rectangle after correction. The detail will be described later with reference to FIGS. 17 and 18.

The output module 190 is connected to the shape correction module 180. The output module 190 outputs the image corrected to the rectangle by the shape correction module 180. Outputting an image includes printing an image by a printing device such as a printer, displaying an image on a display device such as a display, transmitting an image by an image transmitting device such as a facsimile, writing an image in an image storage device such as an image database, storing an image in a storage medium such as a memory card, and transmitting an image to other information processing device.

Figure 2:
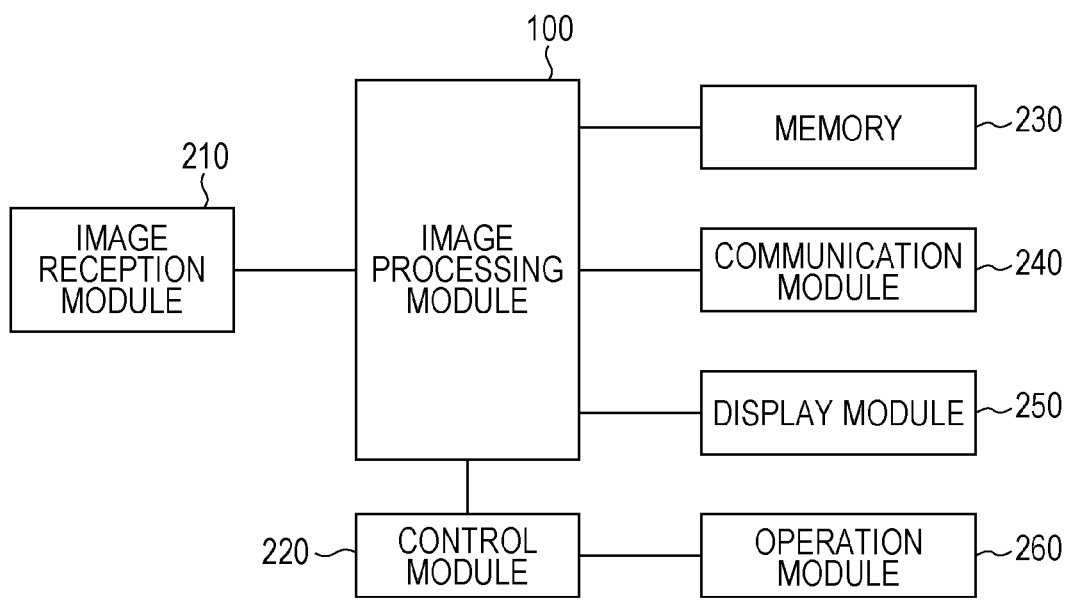
FIG. 2 is a block diagram showing a hardware configuration example of an image processing apparatus that implements an exemplary embodiment.

FIG. 2 is a block diagram showing a hardware configuration example of an image processing apparatus that implements an exemplary embodiment (including the first exemplary embodiment, and second to fourth exemplary embodiments which will be described later).

The hardware configuration includes the image processing module 100, an image reception module 210, a control module 220, a memory 230, a communication module 240, a display module 250, and an operation module 260.

The image processing module 100 is connected to the image reception module 210, the control module 220, the memory 230, the communication module 240, and the display module 250. The modules exemplarily shown in FIG. 1 are formed of the image processing module 100.

The image reception module 210 is connected to the image processing module 100. The edge detection module 110 receives a subject image. For example, the edge detection module 110 is the above-described camera.

The memory 230 is connected to the image processing module 100. The memory 230 stores a subject image, a processing result, etc. The image processing module 100 executes processing by using the memory 230.

The communication module 240 is connected to the image processing module 100. The image processing module 100 outputs the processing result etc. to an external device through the communication module 240.

The display module 250 is connected to the image processing module 100. The display module 250 is a display device such as a liquid crystal display. The image processing module 100 outputs the processing result etc. to the display module 250.

The operation module 260 is connected to the control module 220. The operation module 260 is a keyboard, a mouse, a touch panel, etc. that receives an operation by a user, and receives an instruction for the image processing module 100. For example, the operation module 260 receives an instruction of start of processing by the image processing module 100. The image processing module 100 (in particular, a near-color threshold setting module 2355) executes processing in response to the received instruction.

The control module 220 is connected to the image processing module 100 and the operation module 260. The control module 220 causes the image processing module 100 to execute the processing in response to the instruction received by the operation module 260.

Figure 3:
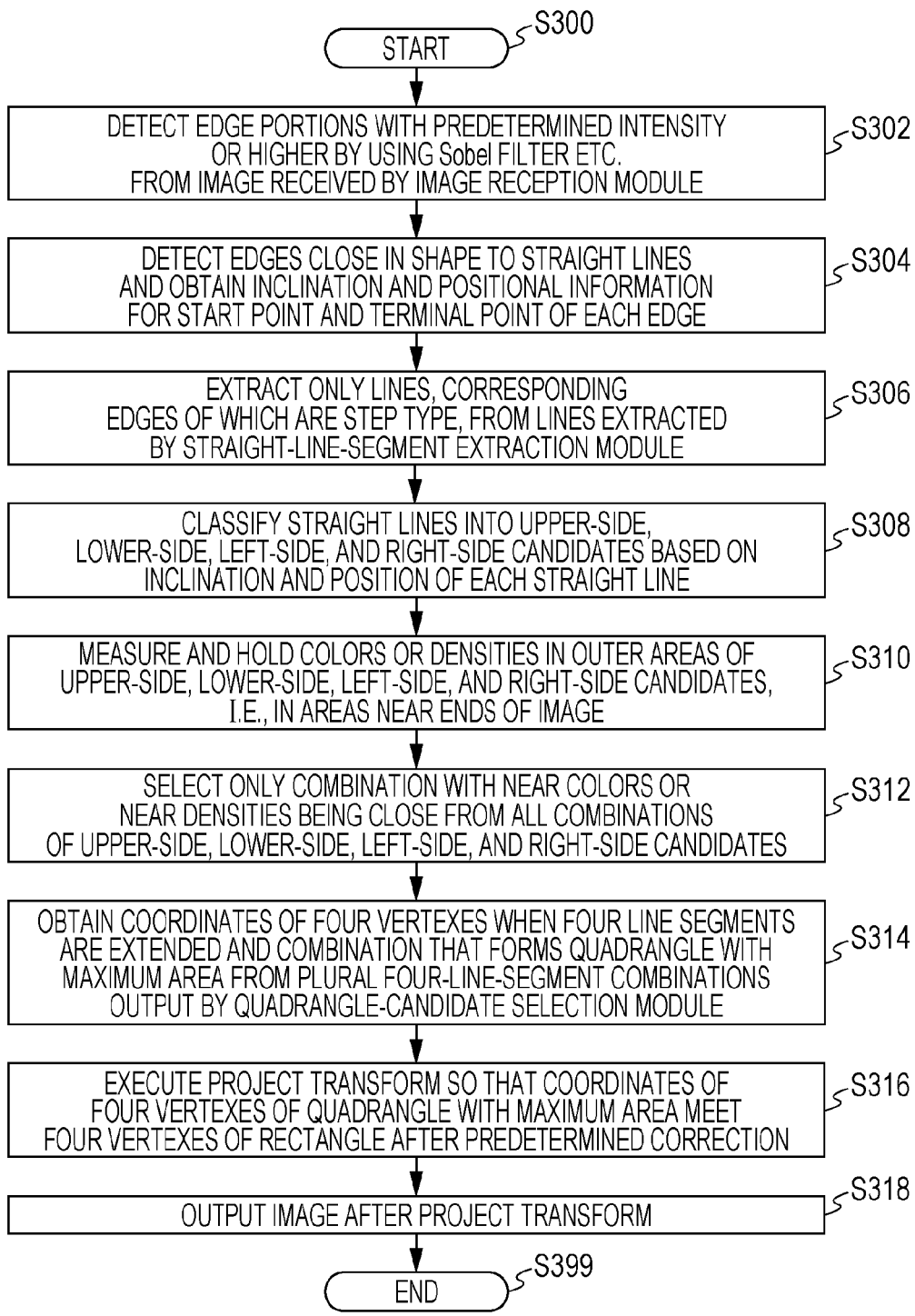
FIG. 3 is a flowchart showing a processing example according to the first exemplary embodiment.

FIG. 3 is a flowchart showing a processing example according to the first exemplary embodiment.

In step S302, the edge detection module 110 uses a Sobel filter or the like and detects edge portions with a predetermined intensity or higher from an image received by the image reception module 210.

In step S304, the straight-line-segment extraction module 120 detects edges close in shape to straight lines, and obtains an inclination and positional information for a start point and a terminal point of each edge.

In step S306, the step-edge detection module 130 extracts only lines, corresponding edges of which are step type, from the lines extracted by the straight-line-segment extraction module 120.

In step S308, the straight-line-segment classification module 140 classifies the straight lines into upper-side, lower-side, left-side, and right-side candidates in accordance with the inclination and position of each straight line.

In step S310, the near-color detection module 150 measures and holds colors or densities in outer areas of the upper-side, lower-side, left-side, and right-side candidates, or in areas near ends of the image.

Figure 4:
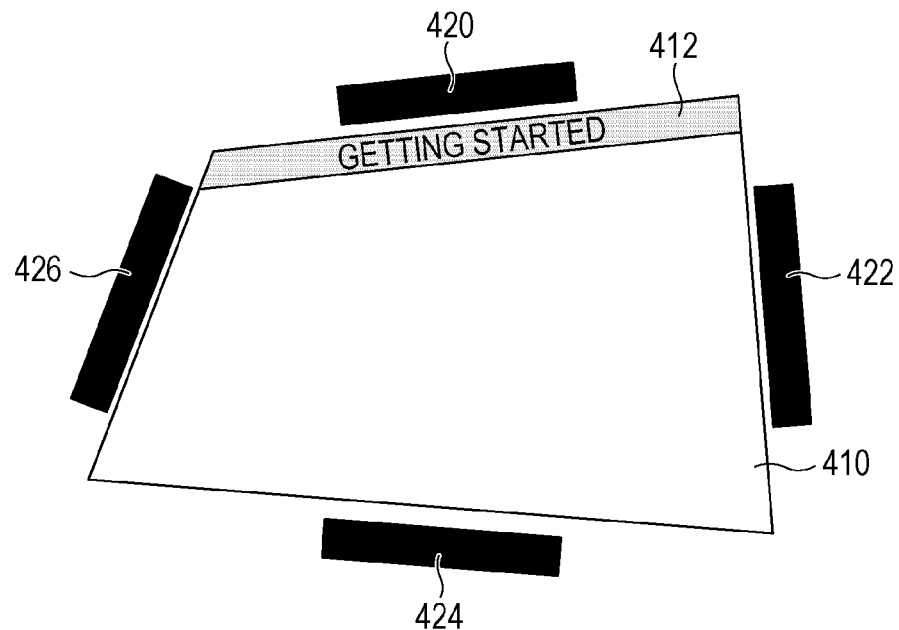
FIG. 4 is an explanatory view showing a processing example according to the first exemplary embodiment.
Figure 5:
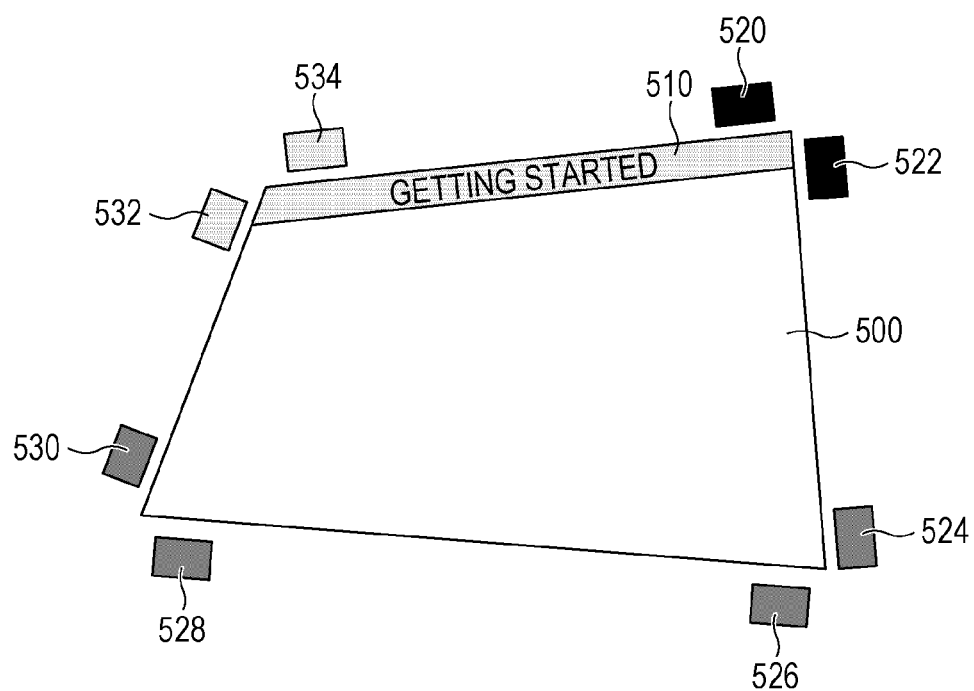
FIG. 5 is an explanatory view showing a processing example according to the first exemplary embodiment.

Explanation is given with reference to examples in FIGS. 4 and 5.

In the example in FIG. 4, colors or densities in an upper area of an upper-side candidate (measurement region (upper area) 420), a lower area of a lower-side candidate (measurement region (lower area) 424), a left area of a left-side candidate (measurement region (left area) 426), and a right area of a right-side candidate (measurement region (right area) 422) are measured and held.

In the example in FIG. 5, colors or densities in outer areas near end points of four sides, or more particularly, colors or densities in an upper area of an upper-side candidate (background (upper right area A) 520, background (upper left area B) 534), a lower area of a lower-side candidate (background (lower right area B) 526, background (lower left area A) 528), a left area of a left-side candidate (background (lower left area B) 530, background (upper left area A) 532), and a right area of a right-side candidate (background (upper right area B) 522, background (lower right area A) 524) are measured and held.

Alternatively, the near-color detection module 150 may detect colors or densities in outer areas near three vertexes or near two diagonal vertexes. To be more specific, outer areas near three vertexes represent three combinations among four combinations (background (upper right area A) 520, background (upper right area B) 522), (background (lower right area A) 524, background (lower right area B) 526), (background (lower left area A) 528, background (lower left area B) 530), and (background (upper left area A) 532, background (upper left area B) 534). Outer areas near two diagonal vertexes represent (background (upper right area A) 520, background (upper right area B) 522) and (background (lower left area A) 528, background (lower left area B) 530), or (background (lower right area A) 524, background (lower right area B) 526) and (background (upper left area A) 532, back ground (upper left area B) 534).

In step S312, the quadrangle-candidate selection module 160 selects only a combination that near colors or near densities are close, from all combinations of the upper-side, lower-side, left-side, and right-side candidates.

In the example in FIG. 4, the combination, in which the colors or the densities in the four areas of the upper area of the upper-side candidate (the measurement region (upper area) 420), the lower area of the lower-side candidate (the measurement region (lower area) 424), the left area of the left-side candidate (the measurement region (left area) 426), and the right area of the right-side candidate (the measurement region (right area) 422) are substantially equivalent (differences of the colors or the densities are within a range of predetermined values), is selected as a candidate of a quadrangle.

In the example in FIG. 5, the colors or the densities detected by the near-color detection module 150 in the outer areas near the vertexes formed by two adjacent sides are targeted. That is, from the upper area of the upper-side candidate (the background (upper right area A) 520, the background (upper left area B) 534), the lower area of the lower-side candidate (the background (lower right area B) 526, the background (lower left area A) 528), the left area of the left-side candidate (the background (lower left area B) 530, the background (upper left area A) 532), and the right area of the right-side candidate (the background (upper right area B) 522, the background (lower right area A) 524), lines that the colors or the densities in outer areas near end points of adjacent sides are selected and serve as candidates for rectangles. To be more specific, the colors or the densities are compared between the background (upper right area A) 520 and the background (upper right area B) 522, between the background (lower right area A) 524 and the background (lower right area B) 526, between the background (lower left area A) 528 and the background (lower left area B) 530, and between the background (upper left area A) 532 and the background (upper left area B) 534. Also, as described above, if the near-color detection module 150 detects colors or densities in outer areas near three vertexes, the colors or the densities are compared among the three combinations. If the near-color detection module 150 detects colors or densities in outer areas near two diagonal vertexes, the colors or the densities are compared between the two combinations. This configuration may be applied to a complicated background, for example, at least a background that is not monochromatic. There are a situation in which the colors or the densities of the background (upper right area A) 520 and the background (upper right area B) 522 are substantially equivalent and the colors or the densities of the background (lower left area A) 528 and the background (lower left area B) 530 are substantially equivalent; or a situation in which the colors or the densities of the background (lower right area A) 524 and the background (lower right area B) 526 are substantially equivalent and the colors or the densities of the background (upper left area A) 532 and the background (upper left area B) 534 are substantially equivalent. Hence, for example, the colors or the densities in the background (upper right area A) 520 and the background (lower left area A) 528 may be different.

In step S314, the maximum-quadrangle detection module 170 obtains coordinates of four vertexes obtained when four line segments are extended, and a combination that forms a quadrangle with a maximum area, from plural four-line-segment combinations output by the quadrangle-candidate selection module 160.

In step S316, the shape correction module 180 executes project transform so that the coordinates of the four vertexes of the quadrangle with the maximum area meet four vertexes of a rectangle after predetermined correction.

In step S318, the output module 190 outputs an image after the project transform.

Figure 6:
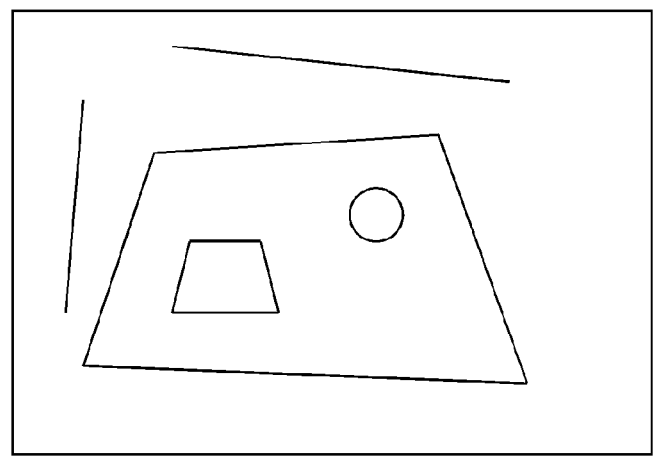
FIG. 6 is an explanatory view showing a processing example according to the first exemplary embodiment (a straight-line-segment extraction module).
Figure 7:
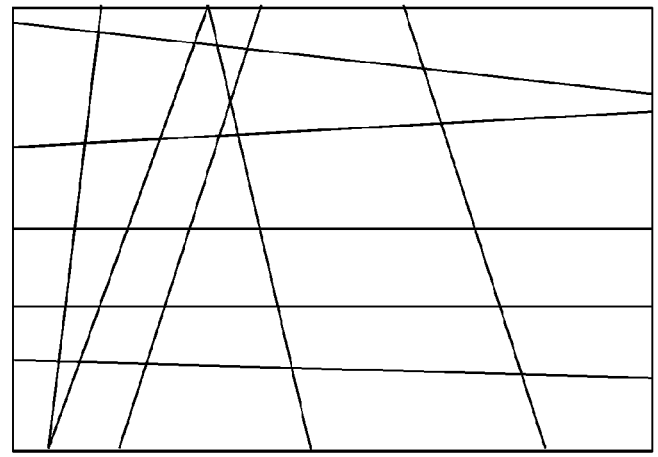
FIG. 7 is an explanatory view showing a processing example according to the first exemplary embodiment (the straight-line-segment extraction module).
Figure 8:
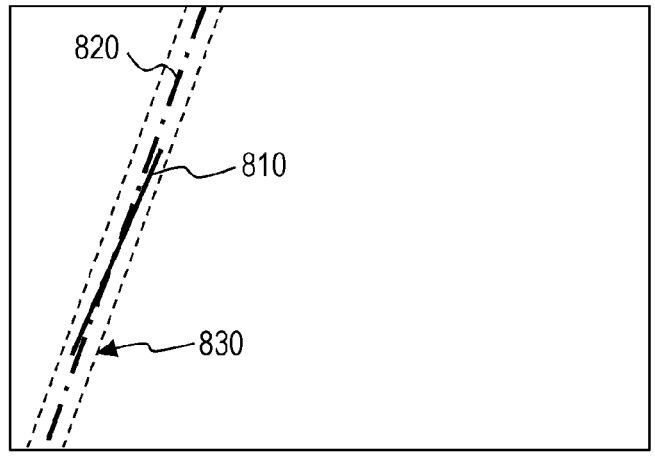
FIG. 8 is an explanatory view showing a processing example according to the first exemplary embodiment (the straight-line-segment extraction module).

The detail of the processing executed by the straight-line-segment extraction module 120 is described with reference to FIGS. 6 to 8.

The straight-line-segment extraction module 120 may obtain an inclination and a distance from an origin of a straight-line edge component in an image by executing Hough transform on an edge image extracted by the edge detection module 110. For example, if the edge image extracted by the edge detection module 110 is an image exemplarily shown in FIG. 6, straight-line segments to be extracted by Hough transform are as exemplarily shown in FIG. 7.

Since a line obtained by Hough transform has information only about an inclination and a distance from an origin of an actual straight-line edge image, the line obtained by Hough transform and the actual edge image are compared with each other, and a range of an edge image present in an area within a predetermined distance is obtained. Thus, coordinates of two ends (start point and terminal point) of the line segment are obtained. At this time, the start point may be any of the two ends. Straight-line components obtained as described above are numbered, listed, and saved. For example, as shown in an example in FIG. 8, the position of a single straight line 820 obtained by Hough transform is compared with the position of an actual edge 810. If the actual edge 810 is in a near area 830 with a predetermined width from the single straight line 820 obtained by Hough transform, it is determined that the single straight line 820 obtained by Hough transform corresponds to the actual edge 810. The coordinates of the start point and the terminal point of the actual edge 810 are used as the start point and terminal point of the single straight line 820 obtained by Hough transform.

The detail of the processing executed by the step-edge detection module 130 is described with reference to FIGS. 9A to 9D.

Figure 9:
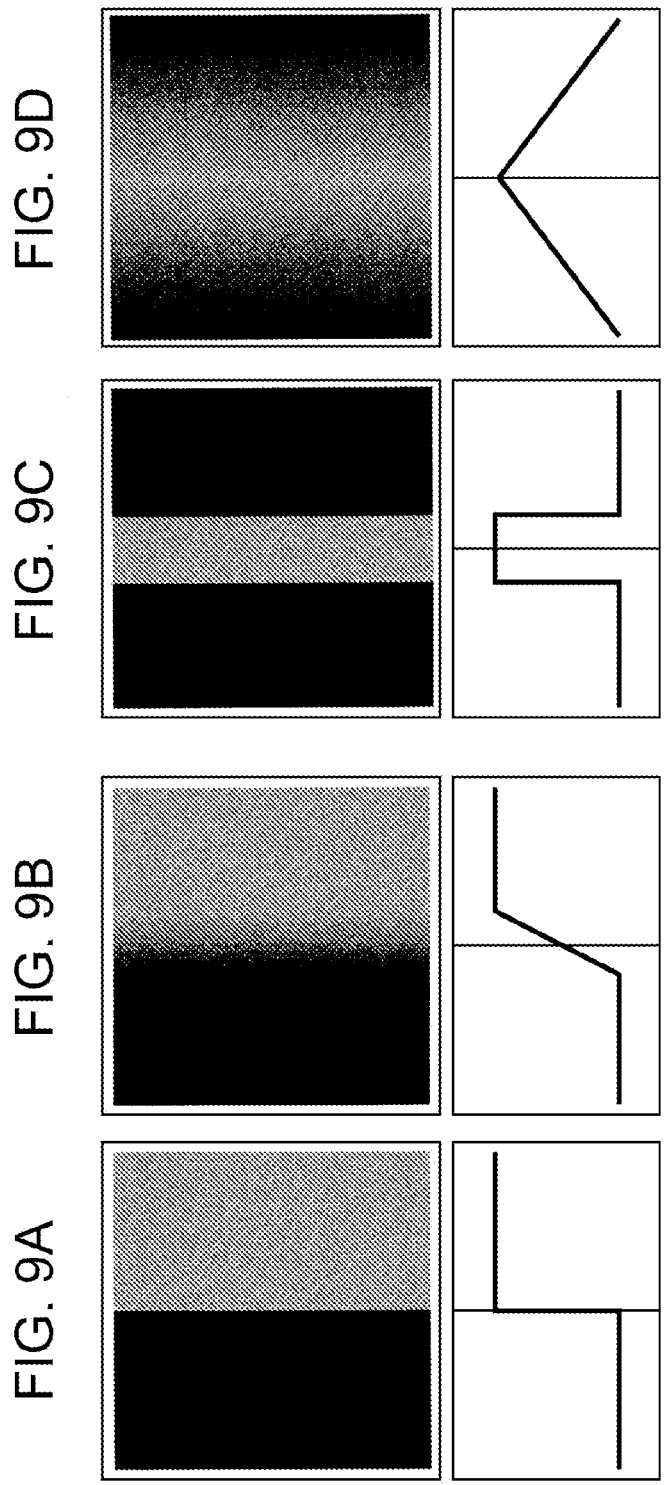
FIGS. 9A to 9D are explanatory views showing processing examples according to the first exemplary embodiment (a step-edge detection module).

The step-edge detection module 130 judges a line segment as a step edge if a difference between pixel values of near pixels located across a line segment extracted by the straight-line-segment extraction module 120 is a predetermined value or larger, and eliminates information of a line segment judged not to be a step edge from the list. To be more specific, edges have four kinds as shown in FIGS. 9A to 9D. An example shown in FIG. 9A is step edge type. An example shown in FIG. 9B is ramp edge type. An example shown in FIG. 9C is ridge type. An example shown in FIG. 9D is roof type. In this exemplary embodiment, an edge of ramp edge type is judged as a step edge. Ruled lines or the like in an image are detected as edges of ridge type or roof type. Determination for the type is made depending on whether or not the distribution of the pixel values has any of shapes of graphs shown below FIGS. 9A to 9D.

Further, the judgment for a step edge may use near plural points located across a line segment or an average value in a near region.

Figure 11:
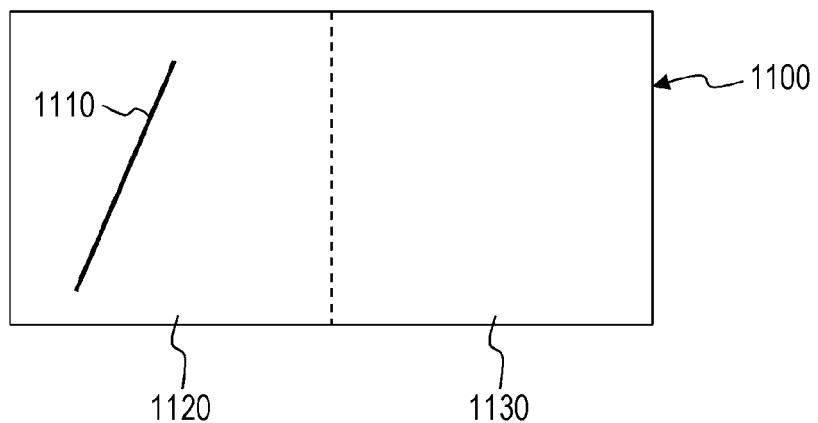
FIG. 11 is an explanatory view showing a processing example according to the first exemplary embodiment (the straight-line-segment classification module).
Figure 12:
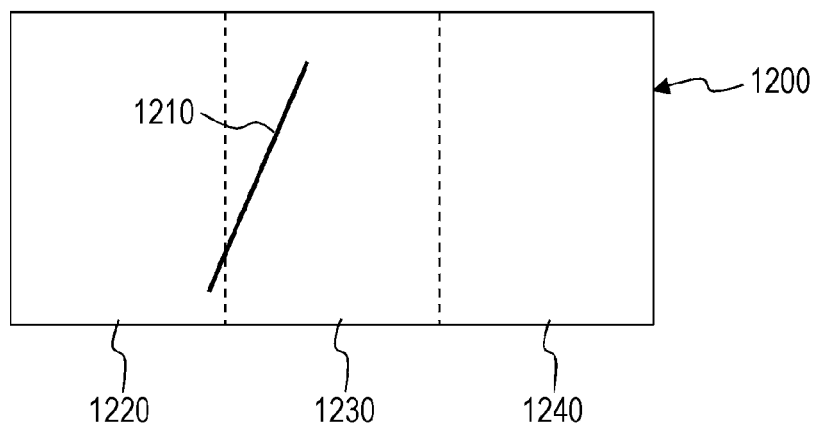
FIG. 12 is an explanatory view showing a processing example according to the first exemplary embodiment (the straight-line-segment classification module).

The detail of the processing executed by the straight-line-segment classification module 140 is described with reference to FIGS. 10 to 12.

The straight-line-segment classification module 140 classifies line segments remaining on the list into four candidates of an upper-side candidate, a lower-side candidate, a left-side candidate, and a right-side candidate. First, line segments are classified into vertical candidates and horizontal candidates in accordance with a direction (inclination) of each straight-line segment.

Figure 10:
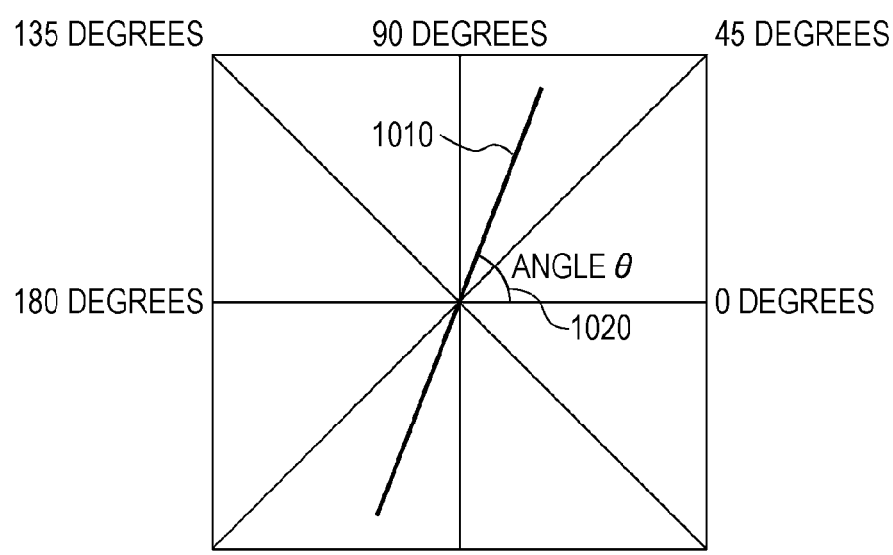
FIG. 10 is an explanatory view showing a processing example according to the first exemplary embodiment (a straight-line-segment classification module).

In an example in FIG. 10, if an inclination of a straight-line segment 1010 (angle θ1020) is in a range from 45 to 135 degrees, the straight-line segment is considered as a vertical candidate, and other straight-line segments are considered as horizontal candidates.

Next, the line segments in the vertical candidates are classified into a left-side candidate and a right-side candidate. To be more specific, as shown in an example of FIG. 11, classification may be made depending on whether a midpoint of a straight-line segment 1110 is located in a left half area (left region 1120) or a right half area (right region 1130) in an image 1100. Alternatively, classification may be made depending on whether an end point is near a left end or a right end, instead of using the midpoint. Still alternatively, as shown in an example in FIG. 12, an image 1200 may be divided by vertical lines into three sections (left region 1220, center region 1230, and right region 1240). A straight-line segment 1210 may be determined as a left-side candidate if the midpoint of the straight-line segment 1210 is located in the left region, may be determined as a right-side candidate if the midpoint is located in the right region, or may be determined as a candidate for both left and right sides if the midpoint is located in the center region.

This may be also applied a horizontal line segment. Classification may be made depending on whether the midpoint of a line segment is located in an upper half area of an image or a lower half area of the image. That is, the line segment may be determined as an upper-side candidate if the midpoint of the line segment is located in a region of the upper half area, or may be determined as a lower-side candidate if the midpoint is located in a region of the lower half area.

Figure 15:
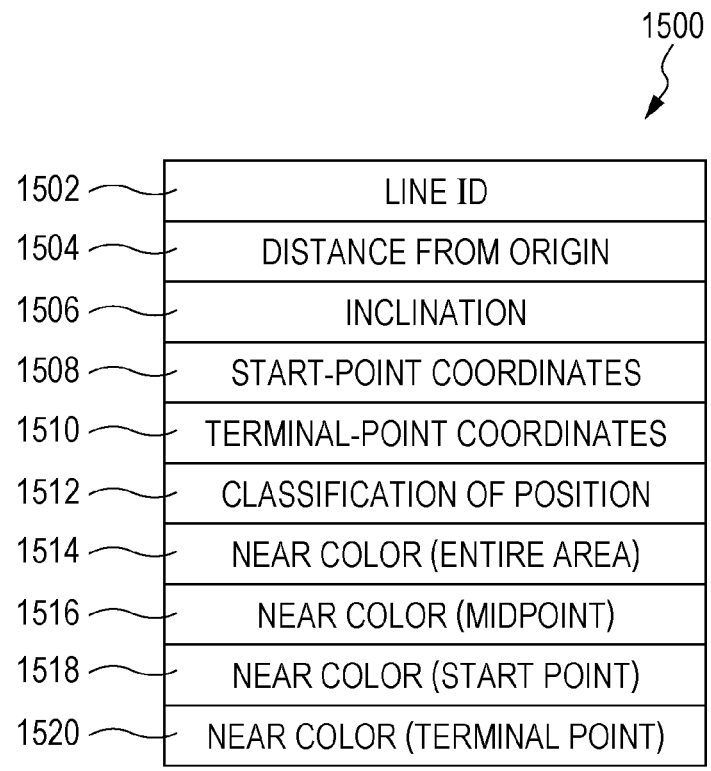
FIG. 15 is an explanatory view showing a data structure example of a line-segment information table.

At this time, while it is assumed that left end points are considered as start points for upper-side and lower-side candidates and upper end points are considered as start points for left-side and right-side candidates, the start points are stored in a data structure of line information which will be described later with reference to an example of FIG. 15. This is for recording the start points with uniformity.

The detail of the processing executed by the near-color detection module 150 is described with reference to FIGS. 13 and 14.

The near-color detection module 150 measures and holds near colors or densities in outer areas of upper-side, lower-side, left-side, and right-side candidates.

Figure 13:
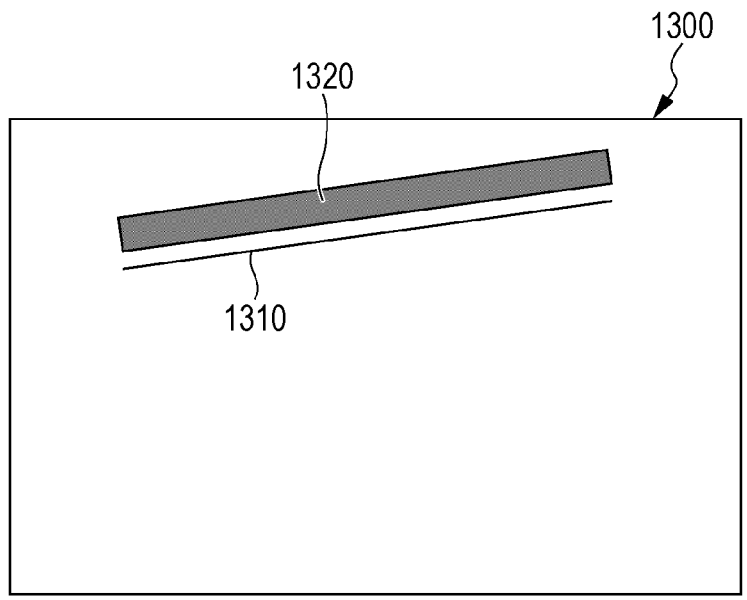
FIG. 13 is an explanatory view showing a processing example according to the first exemplary embodiment (a near-color detection module).
Figure 14:
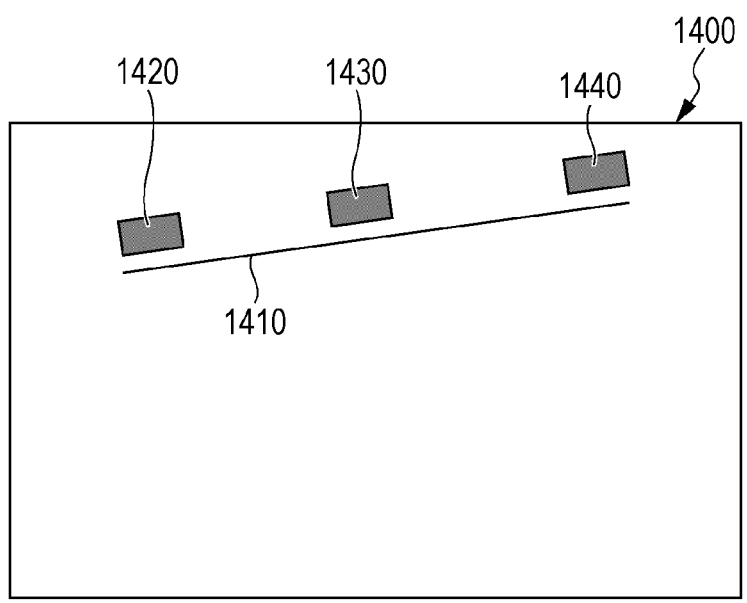
FIG. 14 is an explanatory view showing a processing example according to the first exemplary embodiment (the near-color detection module).

For a measurement region, as shown in an example of FIG. 13, measurement may be made in an entire near region (measurement region (upper area) 1320) in an outer area along a straight-line segment 1310 which is an upper-side candidate. Alternatively, as shown in an example of FIG. 14, only a midpoint near region (measurement region (upper center area) 1430) and terminal-point near regions (measurement region (upper left area) 1420, measurement region (upper right area) 1440) of a straight-line segment 1410 may be measured. Of course, the measurement region is a lower region of a straight-line segment if the straight-line segment is a lower-side candidate, is a left region of a straight-line segment if the straight-line segment is a left-side candidate, or is a right region of a straight-line segment if the straight-line segment is a right-side candidate.

The colors or the densities of the measurement regions may be considered as colors or densities of a background if a subject line is a true boundary in a document image.

The detail of the processing executed by the quadrangle-candidate selection module 160 is described with reference to FIGS. 15 and 16.

A line-segment information table 1500 is an example of the data structure that holds information of each straight-line segment. The line-segment information table 1500 includes a line ID section 1502, a distance-from-origin section 1504, an inclination section 1506, a start-point coordinates section 1508, a terminal-point coordinates section 1510, a classification-of-position section 1512, a near color (entire area) section 1514, a near color (midpoint) section 1516, a near color (start point) section 1518, and a near color (terminal point) section 1520. The line ID section 1502 stores information (line identification (ID)) that allows a straight-line segment to be uniquely identified in this exemplary embodiment. The distance-from-origin section 1504 stores a parameter ρ for Hough transform. The inclination section 1506 stores a parameter θ for Hough transform. The start-point coordinates section 1508 stores coordinates of a start point of the straight-line segment. The terminal-point coordinates section 1510 stores coordinates of a terminal point of the straight-line segment. The classification-of-position section 1512 stores information indicative of which one of upper-side, lower-side, left-side, and right-side candidates corresponds to the straight-line segment. The near color (entire area) section 1514 to the near color (terminal point) section 1520 store colors or densities of regions in an outer area of the straight-line segment. For example, to be more specific, the near color (entire area) section 1514 to the near color (terminal point) section 1520 store RGB values. The near color (entire area) section 1514 stores a measurement result in an entire region (the measurement region (upper area) 1320 shown in the example of FIG. 13). The near color (midpoint) section 1516 stores a measurement result at a midpoint (the measurement region (upper center area) 1430 shown in the example of FIG. 14). The near color (start point) section 1518 stores a measurement result at a start point (the measurement region (upper left area) 1420 shown in the example of FIG. 14). The near color (terminal point) section 1520 stores a measurement result at a terminal point (the measurement region (upper right area) 1440 shown in the example of FIG. 14).

The line-segment information table 1500 is listed by the number of lines. Regarding the near color (entire area) section 1514 to the near color (terminal point) section 1520, only one of the near color (all) section 1514 and the near color (midpoint) section 1516 may be used; only one of the near color (start point) section 1518 and the near color (terminal point) section 1520 may be used; or only one of the near color (midpoint) section 1516, the near color (start point) section 1518, and the near color (terminal point) section 1520 may be used.

Figure 16:
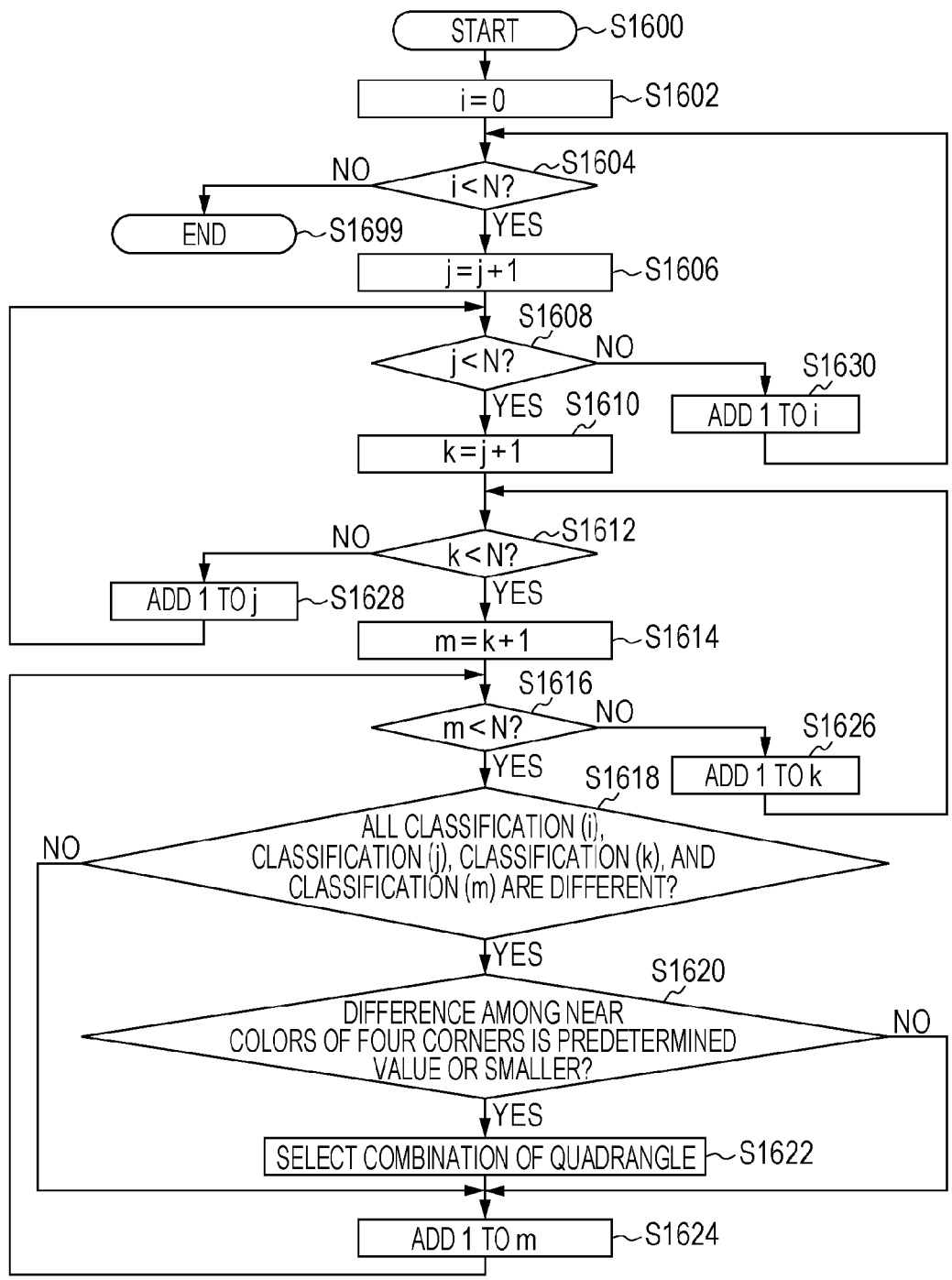
FIG. 16 is an explanatory view showing a processing example according to the first exemplary embodiment (a quadrangle-candidate selection module).

FIG. 16 shows a flowchart of the detail of the processing example by the quadrangle-candidate selection module 160. Herein, N is a total number of straight-line segments, and i, j, k, and m are variables for designating line IDs. In this flowchart example, determination processing of step S1620 is executed for all combinations of straight-line segments.

In step S1602, i=0 is set.

In step S1604, it is determined whether i<N or not. If i<N, the processing goes to step S1606. Otherwise, the processing is ended (step S1699).

In step S1606, j=j+1 is set.

In step S1608, it is determined whether j<N or not. If j<N, the processing goes to step S1610. Otherwise, the processing goes to step S1630.

In step S1610, k=j+1 is set.

In step S1612, it is determined whether k<N or not. If k<N, the processing goes to step S1614. Otherwise, the processing goes to step S1628.

In step S1614, m=k+1 is set.

In step S1616, it is determined whether m<N or not. If m<N, the processing goes to step S1618. Otherwise, the processing goes to step S1626.

In step S1618, it is determined whether all classification (i), classification (j), classification (k), and classification (m) are different or not. If all classifications are different, the processing goes to S1620. Otherwise, the processing goes to step S1624. Classification (i) represents the kind of the line ID i, among the upper-side, lower-side, left-side, and right-side candidates.

In step S1620, it is determined whether or not a difference among near colors of four corners is a predetermined value or smaller. If the difference is the predetermined value or smaller, the processing goes to step S1622. Otherwise, the processing goes to step S1624.

In step S1622, a combination of that quadrangle (line IDs i, j, k, and m) is selected.

In step S1624, 1 is added to m, and the processing returns to step S1616.

In step S1626, 1 is added to k, and the processing returns to step S1612.

In step S1628, 1 is added to j, and the processing returns to step S1608.

In step S1630, 1 is added to i, and the processing returns to step S1604.

Alternatively, the determination processing in step S1620 may determine whether or not a difference among near colors at three corners is a predetermined value or smaller, or may determine whether or not a difference between near colors at two diagonal corners is a predetermined value or smaller, as described above.

The detail of the processing executed by the shape correction module 180 is described with reference to FIGS. 17 and 18.

Figure 17:
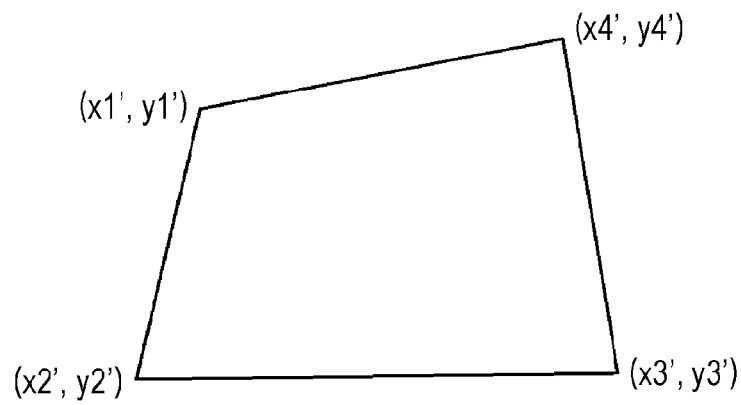
FIG. 17 is an explanatory view showing a processing example according to the first exemplary embodiment (a shape correction module).
Figure 18:
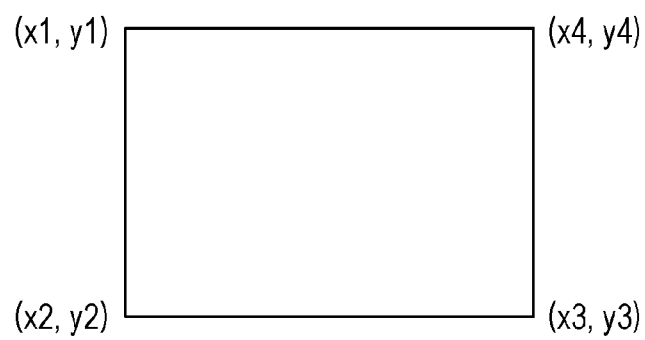
FIG. 18 is an explanatory view showing a processing example according to the first exemplary embodiment (the shape correction module).

If it is assumed that coordinates of four vertexes of a predetermined rectangle shown in an example of FIG. 18 are (x1, y1), (x2, y2), (x3, y3), and (x4, y4), and coordinates of four vertexes of a quadrangle obtained by the maximum-quadrangle detection module 170 shown in an example of FIG. 17 are (x1', y1'), (x2', y2'), (x3', y3'), and (x4', y4'), Expression 2 is calculated by Expression 1 of project transform.

$$x' = \frac{ax + by + c}{px + qy + 1}, y' = \frac{dx + ey + f}{px + qy + 1} \quad \text{Expression 1}$$

-continued $$\begin{pmatrix} x1x1' & y1x1' & -x1 & -y1 & -1 & 0 & 0 & 0 \\ x2x2' & y2x2' & -x2 & -y2 & -1 & 0 & 0 & 0 \\ x3x3' & y3x3' & -x3 & -y3 & -1 & 0 & 0 & 0 \\ x4x4' & y4x4' & -x4 & -y4 & -1 & 0 & 0 & 0 \\ x1y1' & y1y1' & 0 & 0 & 0 & -x1 & -y1 & -1 \\ x2y2' & y1y1' & 0 & 0 & 0 & -x2 & -y2 & -1 \\ x3y3' & y3y3' & 0 & 0 & 0 & -x3 & -y3 & -1 \\ x4y4' & y4y4' & 0 & 0 & 0 & -x4 & -y4 & -1 \end{pmatrix} \begin{pmatrix} p \\ q \\ a \\ b \\ c \\ d \\ e \\ f \end{pmatrix} = \begin{pmatrix} -x1' \\ -x2' \\ -x3' \\ -x4' \\ -y1' \\ -y2' \\ -y3' \\ -y4' \end{pmatrix}$$

Expression 2

By solving Expression 2, unknown parameters p, q, a, b, c, d, e, and f are obtained. With geometric correction, coordinates (x', y') of an original image to be mapped on coordinates (x, y), may be obtained by using Expression 1.

The coordinates of four vertexes of the predetermined rectangle may be values stored in a storage device, may be set by a user through an operation, and may be set in accordance with the size of a received image.

Second Exemplary Embodiment

Figure 19:
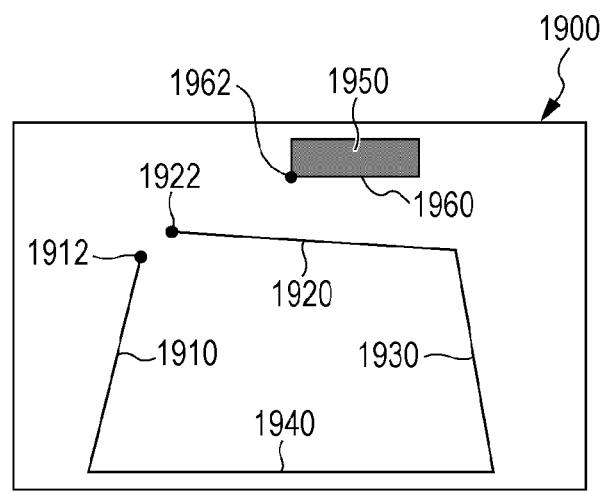
FIG. 19 is an explanatory view showing a processing example according to a second exemplary embodiment.

FIG. 19 is an explanatory view showing a processing example according to a second exemplary embodiment.

The second exemplary embodiment is applied if an object (an object image 1950, for example, a pencil case or an eraser) that is included in an image 1900 in addition to a subject quadrangle (a quadrangle formed by a left-side candidate 1910, an upper-side candidate 1920, a right-side candidate 1930, and a lower-side candidate 1940) in the image 1900.

That is, a line is eliminated if a minimum value of distances between an end point of the line and an end point of an adjacent side candidate is a predetermined value or larger. For example, adjacent sides of the left-side candidate 1910 are the upper-side candidate 1920 and an upper-side candidate 1960. A distance between an end point 1912 of the left-side candidate 1910 and an end point 1922 of the upper-side candidate 1920, and a distance between the end point 1912 of the left-side candidate 1910 and an end point 1962 of the upper-side candidate 1960 are calculated. Then, the upper-side candidate 1960, the calculated distance of which is the predetermined value or larger, is eliminated.

Figure 20:
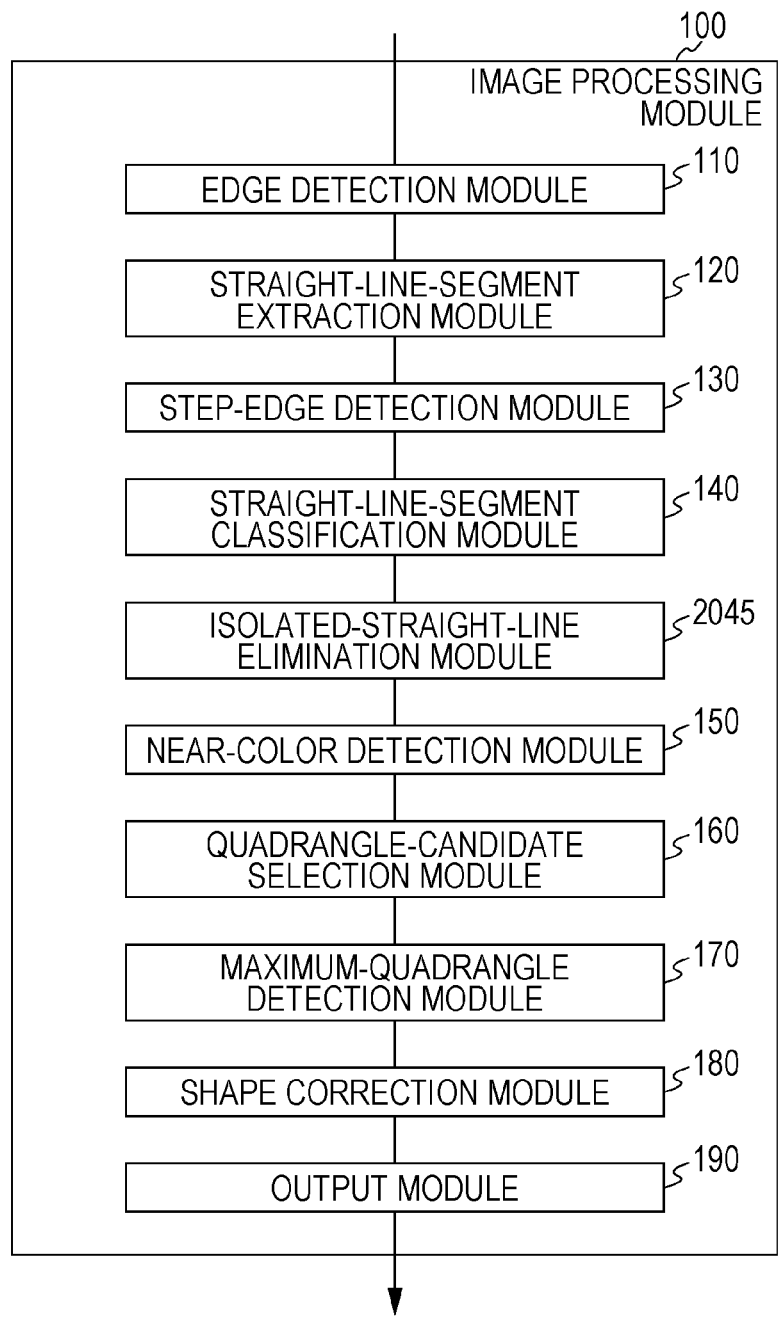
FIG. 20 is a conceptual module configuration diagram for a configuration example according to the second exemplary embodiment.

FIG. 20 is a conceptual module configuration diagram for a configuration example according to the second exemplary embodiment. The same reference signs are applied to portions of kinds similar to those of the above-described exemplary embodiment, and redundant explanation is omitted (the same apply hereinafter).

An image processing apparatus according to the second exemplary embodiment corrects an image having a projective distortion. As shown in an example of FIG. 20, an image processing module 100 includes an edge detection module 110, a straight-line-segment extraction module 120, a step-edge detection module 130, a straight-line-segment classification module 140, an isolated-straight-line elimination module 2045, a near-color detection module 150, a quadrangle-candidate selection module 160, a maximum-quadrangle detection module 170, a shape correction module 180, and an output module 190. That is, the isolated-straight-line elimination module 2045 is added to the first exemplary embodiment.

The straight-line-segment classification module 140 is connected to the step-edge detection module 130 and the isolated-straight-line elimination module 2045.

The isolated-straight-line elimination module 2045 is connected to the straight-line-segment classification module 140 and the near-color detection module 150. The isolated-straight-line elimination module 2045 eliminates a straight-line segment of one side if distances between end points of the straight-line segment of the one side and end points of straight-line segments of two sides that may intersect with the one side, from straight-line segments classified into four sides by the straight-line-segment classification module 140, are larger than a predetermined third value, or equal to or larger than the predetermined third value. That is, an isolated straight-line segment is eliminated from the processing result of the straight-line-segment classification module 140. "Straight-line segments of two sides that may intersect with a straight-line segment" are specifically left-side and right-side candidates for each of upper-side and lower-side candidates, or are upper-side and lower-side candidates for each of left-side and right-side candidates. The "distance between end points" is specifically a distance between an end point A of one straight-line segment and an end point of two points of the other straight-line segment closer to the end point A. Also, if there are plural sets of two-side straight-line segments that may intersect with one-side straight-line segment, relationships with respect to all straight-line segments that may intersect with the one-side straight-line segment correspond to a distance larger than the third value, or equal to or larger than the third value, the one-side straight-line segment is eliminated.

The near-color detection module 150 is connected to the isolated-straight-line-segment elimination module 2045 and the quadrangle-candidate selection module 160.

The near-color detection module 150 and the quadrangle-candidate selection module 160 do not target the straight-line segment eliminated by the isolated-straight-line elimination module 2045. That is, a combination with the eliminated straight-line segment is not targeted.

Figure 21:
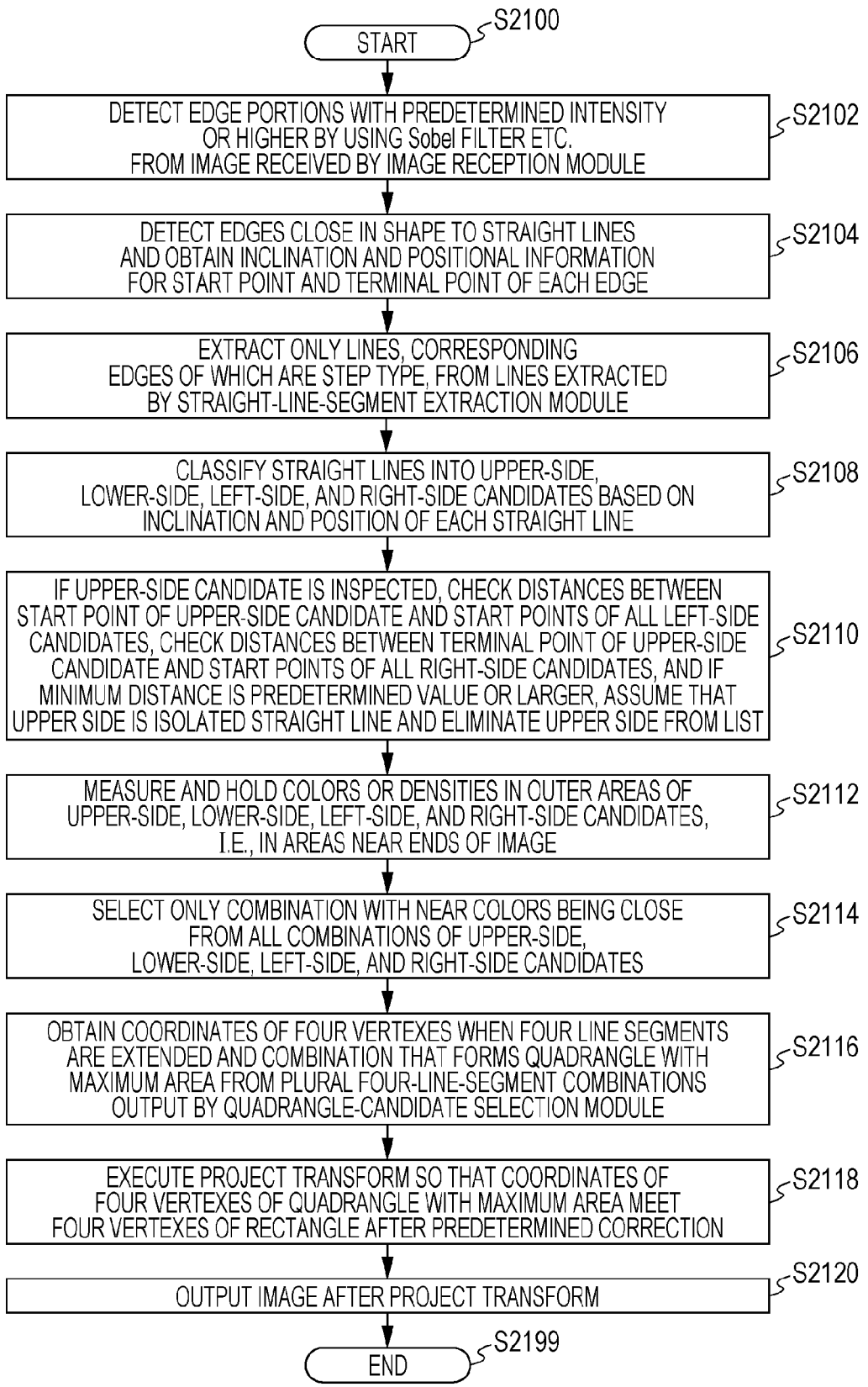
FIG. 21 is a flowchart showing a processing example according to the second exemplary embodiment.

FIG. 21 is a flowchart showing a processing example according to the second exemplary embodiment.

In step S2102, the edge detection module 110 uses a Sobel filter or the like and detects edge portions with a predetermined intensity or higher from an image received by the image reception module 210.

In step S2104, the straight-line-segment extraction module 120 detects edges close in shape to straight lines, and obtains an inclination and positional information for a start point and a terminal point of each edge.

In step S2106, the step-edge detection module 130 extracts only lines, corresponding edges of which are step type, from the lines extracted by the straight-line-segment extraction module 120.

In step S2108, the straight-line-segment classification module 140 classifies the straight lines into the upper-side, lower-side, left-side, and right-side candidates in accordance with the inclination and position of each straight line.

In step S2110, if an upper-side candidate is to be inspected, the isolated-straight-line elimination module 2045 checks distances between a start point of the upper-side candidate and start points of all left-side candidates, checks distances between a terminal point of the upper-side candidate and start points of all right-side candidates, and if a minimum distance of the distances is a predetermined value or larger, assumes that the upper side is an isolated straight line, and eliminates the upper side from the list.

In step S2112, the near-color detection module 150 measures and holds colors or densities in outer areas of upper-side, lower-side, left-side, and right-side candidates, or in areas near ends of the image.

In step S2114, the quadrangle-candidate selection module 160 selects only a combination with near colors being close, from all combinations of the upper-side, lower-side, left-side, and right-side candidates. The state in which near colors are close represents that a distance between near colors calculated in a certain color space is a predetermined value or smaller.

In step S2116, the maximum-quadrangle detection module 170 obtains coordinates of four vertexes obtained when four line segments are extended, and a combination that forms a quadrangle with a maximum area, from plural four-line-segment combinations output by the quadrangle-candidate selection module 160.

In step S2118, the shape correction module 180 executes project transform so that the coordinates of the four vertexes of the quadrangle with the maximum area meet four vertexes of the rectangle after predetermined correction.

In step S2120, the output module 190 outputs an image after the project transform.

Figure 22:
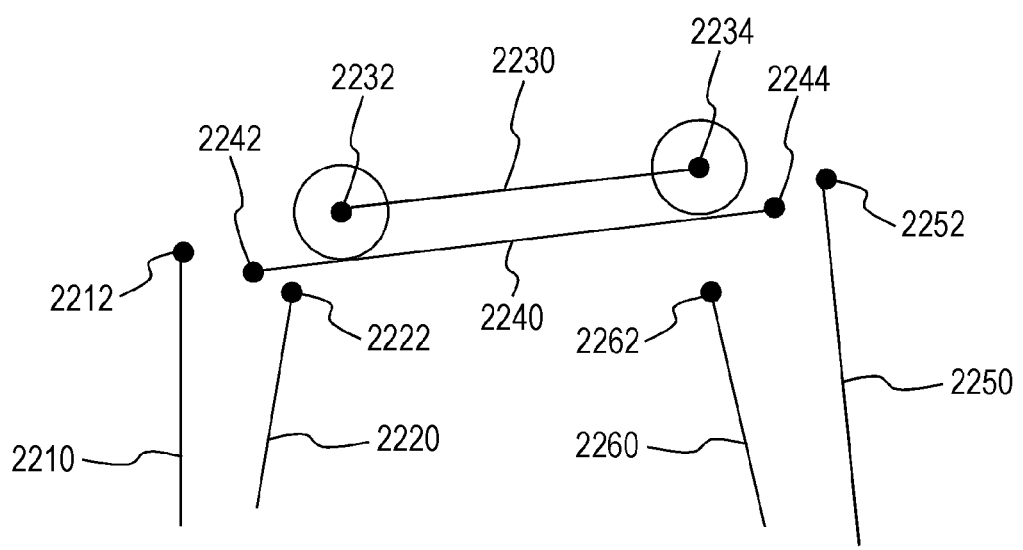
FIG. 22 is an explanatory view showing a processing example according to the second exemplary embodiment (an isolated-straight-line elimination module).

FIG. 22 is an explanatory view showing a processing example according to the second exemplary embodiment (the isolated-straight-line elimination module 2045).

If the upper-side candidate is to be inspected, the isolated-straight-line elimination module 2045 checks distances between a start point of the upper-side candidate and start points of all left-side candidates, checks distances between a terminal point of the upper-side candidate and start points of all right-side candidates, and if a minimum distance of the distances is a predetermined value or larger, assumes that the upper side is an isolated straight line, and eliminates the upper-side candidate from the list. For example, a distance between an end point 2232, which is a start point of an upper-side candidate 2230, and an end point 2212, which is a start point of a left-side candidate 2210, is calculated; a distance between the end point 2232, which is the start point of the upper-side candidate 2230, and an end point 2222, which is a start point of a left-side candidate 2220, is calculated; a distance between an end point 2234, which is a terminal point of the upper-side candidate 2230, and an end point 2252, which is a start point of a right-side candidate 2250 is calculated; and a distance between the end point 2234, which is a terminal point of the upper-side candidate 2230, and an end point 2262, which is a start point of a right-side candidate 2260 is calculated. If all of the calculated distances are equal to or larger than a predetermined distance, the upper-side candidate 2230 is eliminated. An end point of an upper-side candidate 2240 is at a distance smaller than the predetermined distance from the end points of the left-side candidate 2220 and the right-side candidate 2250. Hence, the upper-side candidate 2240 is not eliminated.

Third Exemplary Embodiment

Figure 23:
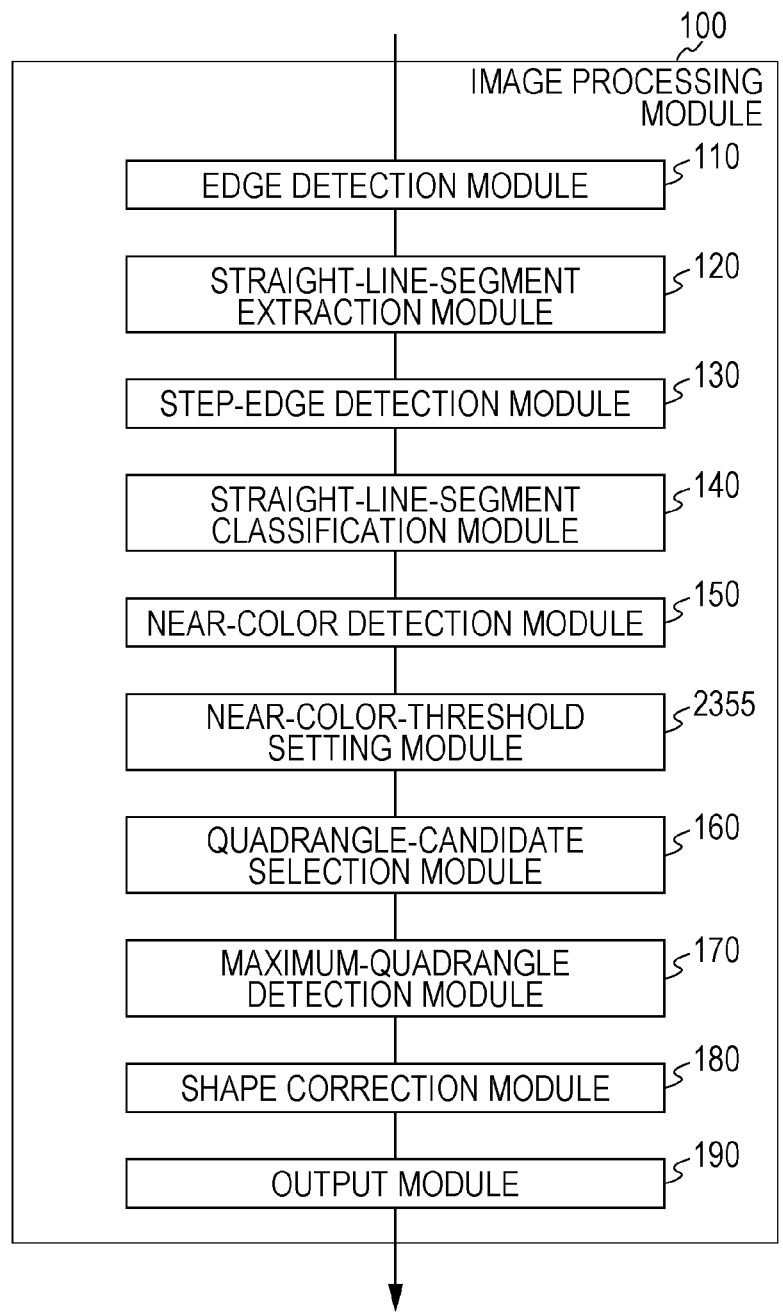
FIG. 23 is a conceptual module configuration diagram for a configuration example according to a third exemplary embodiment.

FIG. 23 is a conceptual module configuration diagram for a configuration example according to a third exemplary embodiment.

An image processing apparatus according to the third exemplary embodiment corrects an image having a projective distortion. As shown in an example of FIG. 23, an image processing module 100 includes an edge detection module 110, a straight-line-segment extraction module 120, a step-edge detection module 130, a straight-line-segment classification module 140, a near-color detection module 150, a near-color-threshold setting module 2355, a quadrangle-candidate selection module 160, a maximum-quadrangle detection module 170, a shape correction module 180, and an output module 190. That is, the near-color-threshold setting module 2355 is added to the first exemplary embodiment.

The near-color detection module 150 is connected to the straight-line-segment classification module 140 and the near-color-threshold setting module 2355.

The near-color-threshold setting module 2355 is connected to the near-color detection module 150 and the quadrangle-candidate selection module 160. The near-color-threshold setting module 2355 sets a predetermined second value that is used by the quadrangle-candidate selection module 160, in accordance with an operation by an operator who selects change in color of a background region. That is, a threshold for judging the closeness of near colors of side candidates is variable. "Change in color of the background region" designates whether the color of the background region other than a document as a subject is rapidly changed or not. For example, if a captured image is a document that is put on a table on which nothing else is present, the color of a background is hardly changed. However, if a captured image is a whiteboard, the color of the background is rapidly changed. For an easier operation of an operator, a mode ("whiteboard image capture mode," "document image capture mode") may be selected. More specifically, in the whiteboard image capture mode, various objects are possibly present around the whiteboard, and the color of the background region is rapidly changed. In the document image capture mode, the color of, for example, the table is possibly constant, and the color of the background region is hardly changed. In the "whiteboard image capture mode," the predetermined second value used by the quadrangle-candidate selection module 160 is set to be larger than a standard value. In the "document image capture mode," the predetermined second value used by the quadrangle-candidate selection module 160 is set to be smaller than the standard value.

The quadrangle-candidate selection module 160 is connected to the near-color-threshold setting module 2355 and the maximum-quadrangle detection module 170.

Figure 24:
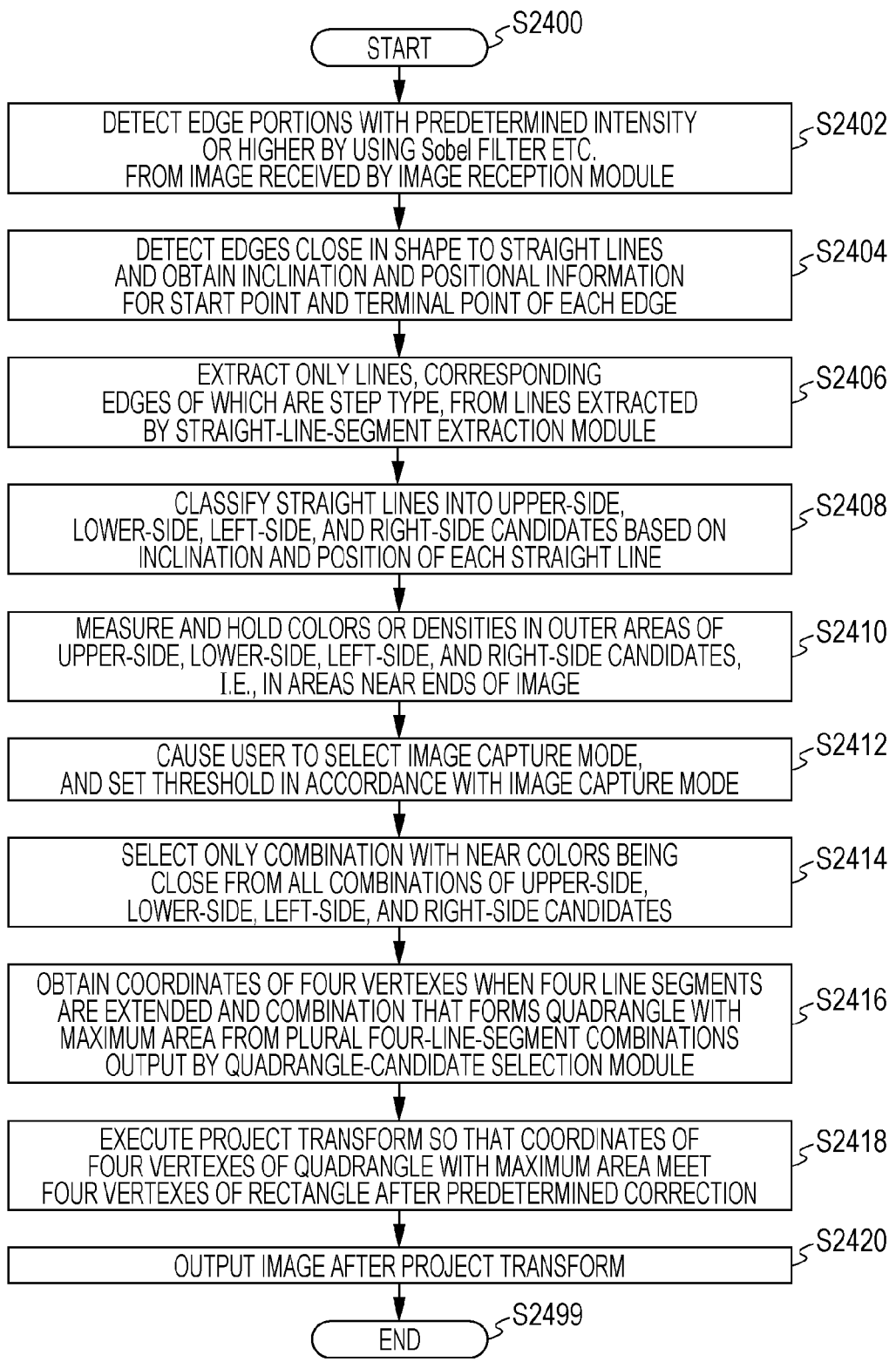
FIG. 24 is a flowchart showing a processing example according to the third exemplary embodiment.

FIG. 24 is a flowchart showing a processing example according to the third exemplary embodiment.

In step S2402, the edge detection module 110 uses a Sobel filter or the like and detects edge portions with a predetermined intensity or higher from an image received by the image reception module 210.

In step S2404, the straight-line-segment extraction module 120 detects edges close in shape to straight lines, and obtains an inclination and positional information for a start point and a terminal point of each edge.

In step S2406, the step-edge detection module 130 extracts only lines, corresponding edges of which are step type, from the lines extracted by the straight-line-segment extraction module 120.

In step S2408, the straight-line-segment classification module 140 classifies the straight lines into the upper-side, lower-side, left-side, and right-side candidates in accordance with the inclination and position of each straight line.

In step S2410, the near-color detection module 150 measures and holds colors or densities in outer areas of upper-side, lower-side, left-side, and right-side candidates, or in areas near ends of the image.

In step S2412, the near-color-threshold setting module 2355 causes a user to select an image capture mode, and sets a threshold in accordance with the image capture mode. To be more specific, in the whiteboard image capture mode, since various objects are possibly present around the whiteboard, the threshold is set at a large value, and in the document image capture mode, since the image of the document is captured on a place with a constant color such as a table, the threshold is set at a small value.

In step S2414, the quadrangle-candidate selection module 160 selects only a combination with near colors being close, from all combinations of the upper-side, lower-side, left-side, and right-side candidates. The state in which near closes are close represents that a distance between near colors calculated in a certain color space is a predetermined value or smaller.

In step S2416, the maximum-quadrangle detection module 170 obtains coordinates of four vertexes obtained when four line segments are extended, and a combination that forms a quadrangle with a maximum area, from plural four-line-segment combinations output by the quadrangle-candidate selection module 160.

In step S2418, the shape correction module 180 executes project transform so that the coordinates of the four vertexes of the quadrangle with the maximum area meet four vertexes of the rectangle after predetermined correction.

In step S2420, the output module 190 outputs an image after the project transform.

Fourth Exemplary Embodiment

Figure 25:
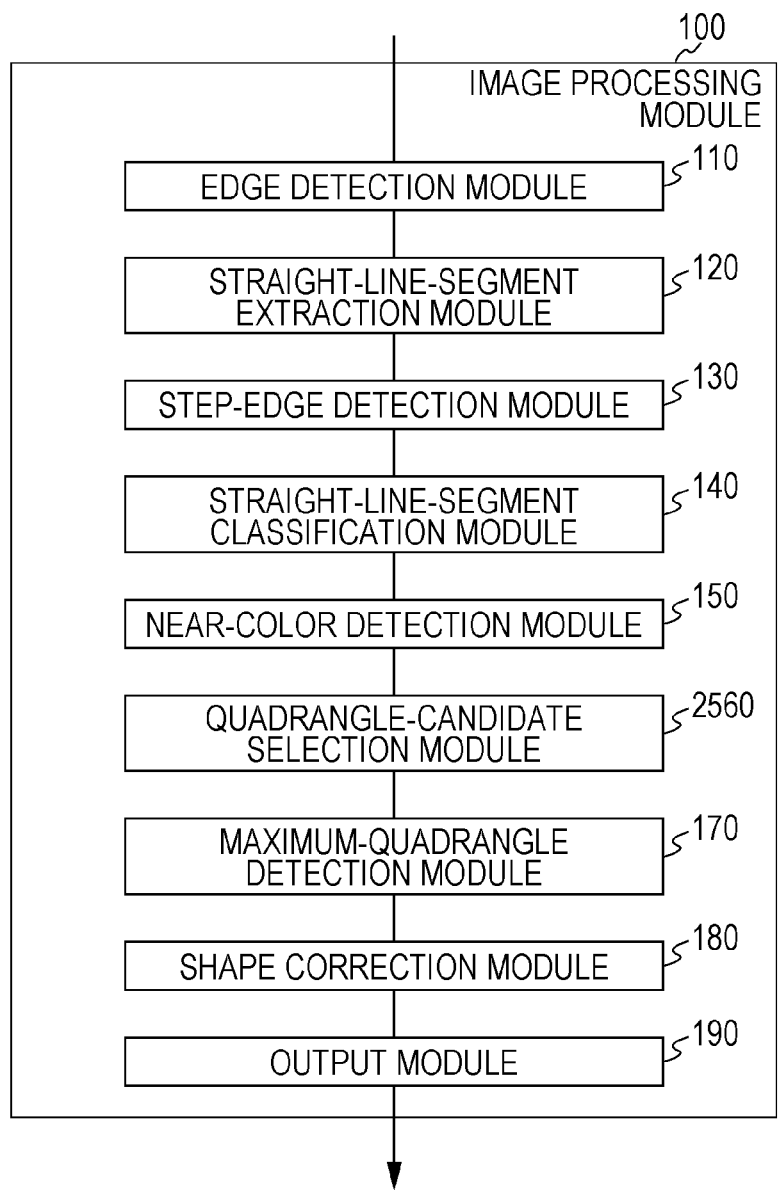
FIG. 25 is a conceptual module configuration diagram for a configuration example according to a fourth exemplary embodiment.

FIG. 25 is a conceptual module configuration diagram for a configuration example according to a fourth exemplary embodiment.

An image processing apparatus according to the fourth exemplary embodiment corrects an image having a projective distortion. As shown in an example of FIG. 25, an image processing module 100 includes an edge detection module 110, a straight-line-segment extraction module 120, a step-edge detection module 130, a straight-line-segment classification module 140, a near-color detection module 150, a quadrangle-candidate selection module 2560, a maximum-quadrangle detection module 170, a shape correction module 180, and an output module 190. That is, the quadrangle-candidate selection module 160 according to the first exemplary embodiment is replaced with the quadrangle-candidate selection module 2560. The quadrangle-candidate selection module 2560 includes the processing content of the quadrangle-candidate selection module 160.

The near-color detection module 150 is connected to the straight-line-segment classification module 140 and the quadrangle-candidate selection module 2560.

The quadrangle-candidate selection module 2560 is connected to the near-color detection module 150 and the maximum-quadrangle detection module 170. If a ratio of an area of a quadrangle formed by a selected combination to an image is equal to or smaller than a predetermined fourth value, or smaller than the predetermined fourth value, the quadrangle-candidate selection module 2560 changes the predetermined second value and executes the selection processing again. That is, if the quadrangle-candidate selection module 2560 does not select a proper quadrangle, the threshold (the second value) is changed, and the selection processing for a quadrangle candidate is executed again. The detail of this processing is described with reference to a flowchart exemplarily shown in FIG. 27.

The maximum-quadrangle detection module 170 is connected to the quadrangle-candidate selection module 2560 and the shape correction module 180.

Figure 26:
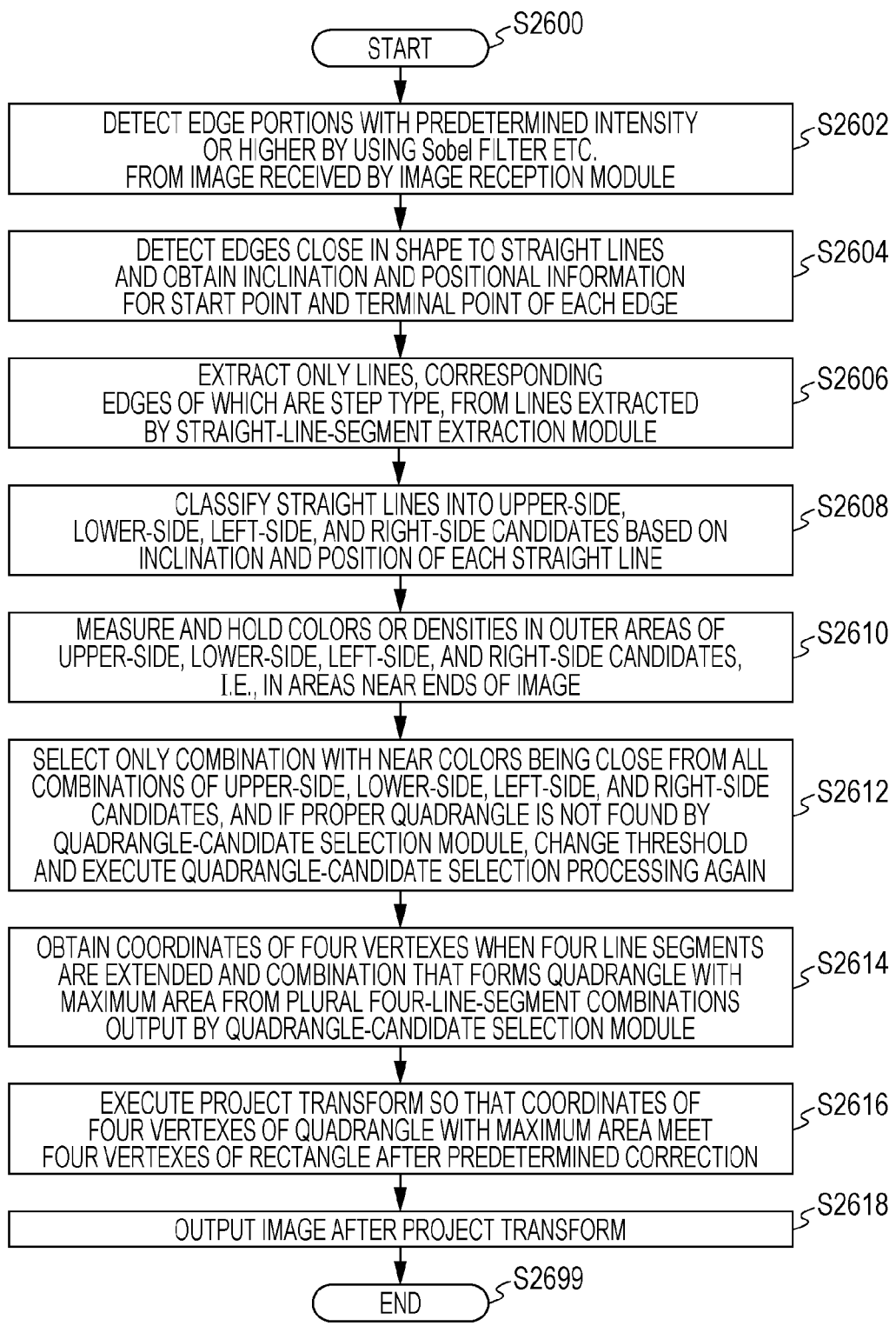
FIG. 26 is a flowchart showing a processing example according to the fourth exemplary embodiment.

FIG. 26 is a flowchart showing a processing example according to the fourth exemplary embodiment.

In step S2602, the edge detection module 110 uses a Sobel filter or the like and detects edge portions with a predetermined intensity or higher from an image received by the image reception module 210.

In step S2604, the straight-line-segment extraction module 120 detects edges close in shape to straight lines, and obtains an inclination and positional information for a start point and a terminal point of each edge.

In step S2606, the step-edge detection module 130 extracts only lines, corresponding edges of which are step type, from the lines extracted by the straight-line-segment extraction module 120.

In step S2608, the straight-line-segment classification module 140 classifies the straight lines into upper-side, lower-side, left-side, and right-side candidates in accordance with the inclination and position of each straight line.

In step S2610, the near-color detection module 150 measures and holds colors or densities in outer areas of the upper-side, lower-side, left-side, and right-side candidates, or in areas near ends of the image.

In step S2612, the quadrangle-candidate selection module 160 selects only a combination with near colors being close, from all combinations of the upper-side, lower-side, left-side, and right-side candidates. The state in which near colors are close represents that a distance between near colors calculated in a certain color space is a predetermined value or smaller. If the quadrangle-candidate selection module 160 does not find a proper quadrangle, the threshold is changed, and the quadrangle-candidate selection processing is executed again.

In step S2614, the maximum-quadrangle detection module 170 obtains coordinates of four vertexes obtained when four line segments are extended, and a combination that forms a quadrangle with a maximum area, from plural four-line-segment combinations output by the quadrangle-candidate selection module 160.

In step S2616, the shape correction module 180 executes project transform so that the coordinates of the four vertexes of the quadrangle with the maximum area meet four vertexes of the rectangle after predetermined correction.

In step S2618, the output module 190 outputs an image after the project transform.

Figure 27:
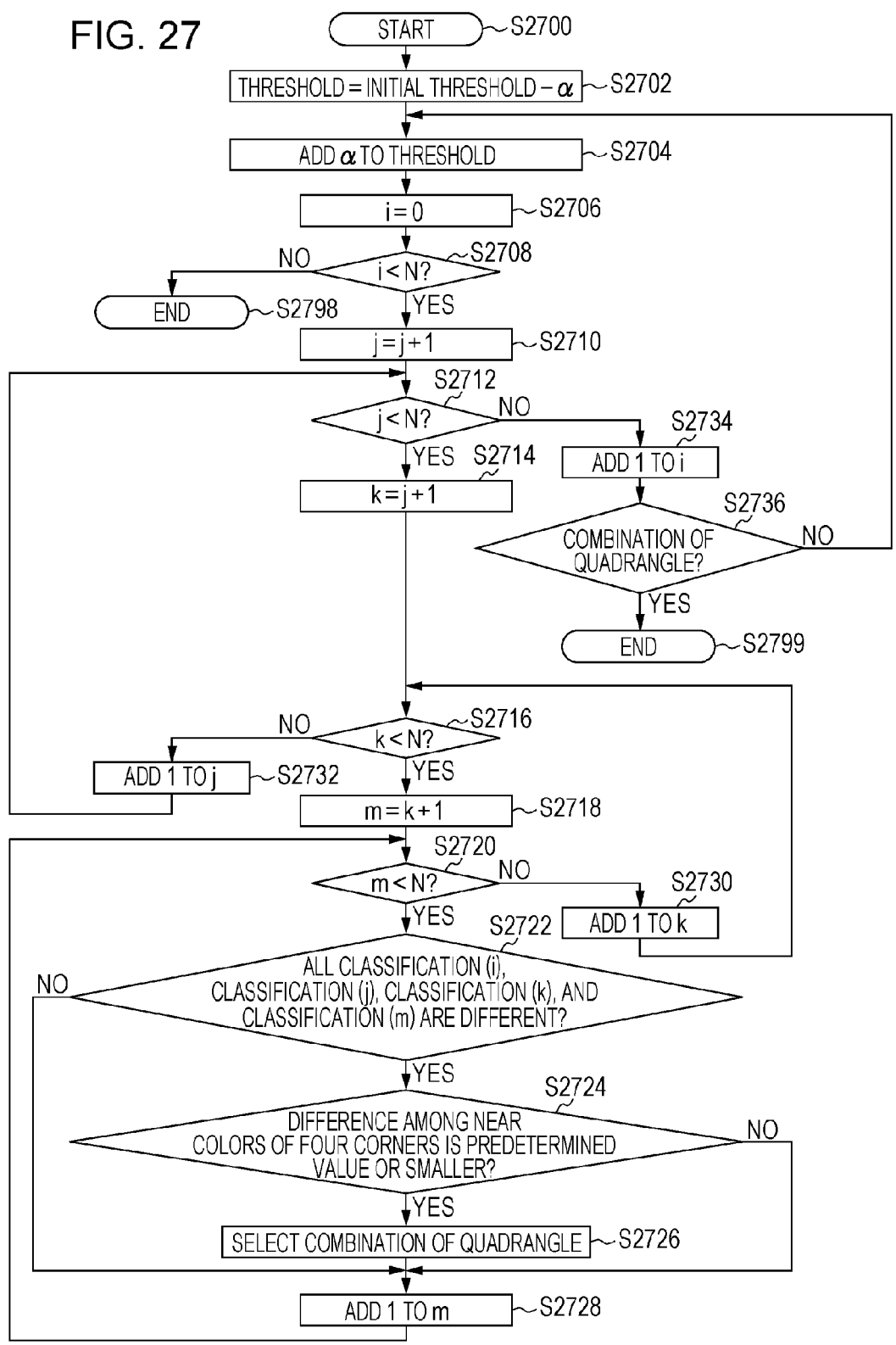
FIG. 27 is a flowchart showing a processing example according to the fourth exemplary embodiment.

FIG. 27 is a flowchart showing a processing example according to the fourth exemplary embodiment. Herein, N is a total number of straight-line segments, and i, j, k, and m are variables for designating line IDs. $\alpha$ is a predetermined value. In this flowchart example, determination processing of step S2724 is executed for all combinations of straight-line segments. If no quadrangle is selected (Y in step S2736), $\alpha$ is added to the threshold (the second value) in step S2704, so that a quadrangle is easily selected.

In step S2702, threshold=initial threshold−$\alpha$ is set.
In step S2704, $\alpha$ is added to the threshold.
In step S2706, i=0 is set.
In step S2708, it is determined whether i<N or not. If i<N, the processing goes to step S2710. Otherwise, the processing is ended (step S2798).

In step S2710, j=j+1 is set.

In step S2712, it is determined whether j<N or not. If j<N, the processing goes to step S2714. Otherwise, the processing goes to step S2734.

In step S2714, k=j+1 is set.

In step S2716, it is determined whether k<N or not. If k<N, the processing goes to step S2718. Otherwise, the processing goes to step S2732.

In step S2718, m=k+1 is set.

In step S2720, it is determined whether m<N or not. If m<N, the processing goes to step S2722. Otherwise, the processing goes to step S2730.

In step S2722, it is determined whether all classification (i), classification (j), classification (k), and classification (m) are different or not. If all classifications are different, the processing goes to S2724. Otherwise, the processing goes to step S2728.

In step S2724, it is determined whether or not a difference among near colors of four corners is a predetermined value or smaller. If the difference is the predetermined value or smaller, the processing goes to step S2726. Otherwise, the processing goes to step S2728.

In step S2726, a combination of this quadrangle is selected.

In step S2728, 1 is added to m, and the processing returns to step S2720.

In step S2730, 1 is added to k, and the processing returns to step S2716.

In step S2732, 1 is added to j, and the processing returns to step S2712.

In step S2734, 1 is added to i, and the processing goes to step S2736.

In step S2736, it is determined whether there is no combination for a selected quadrangle or not. If no quadrangle is selected, the processing returns to step S2704. Otherwise, the processing is ended (step S2799).

Alternatively, the determination processing in step S2722 may determine whether or not a difference among near colors at three corners is a predetermined value or smaller, or may determine whether or not a difference between near colors at two diagonal corners is a predetermined value or smaller, as described above.

Figure 28:
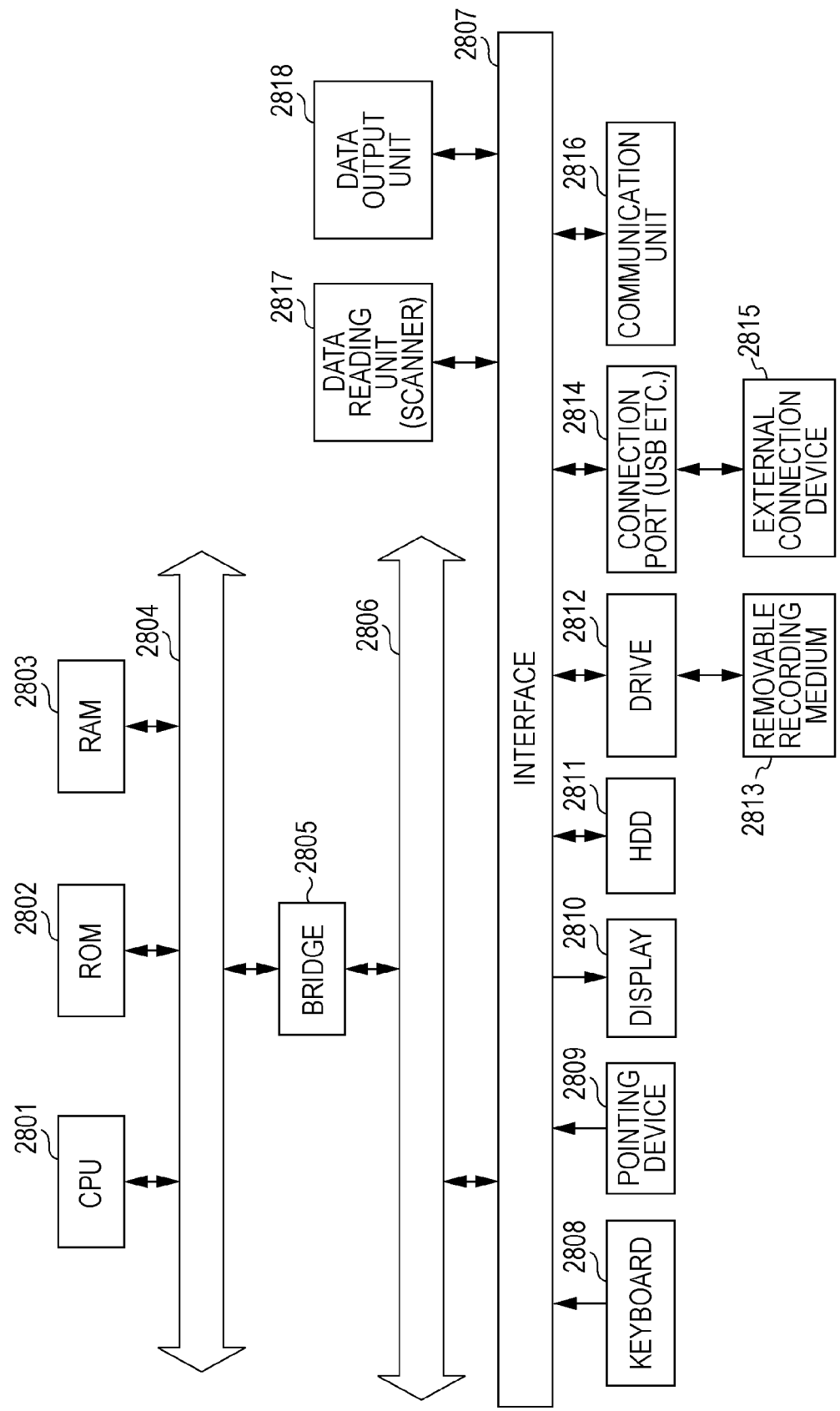
FIG. 28 is a block diagram showing a hardware configuration example of a computer that implements an exemplary embodiment.

A hardware configuration example of the image processing apparatus according to this exemplary embodiment is described with reference to FIG. 28. The configuration shown in FIG. 28 is formed of, for example, a personal computer (PC), and FIG. 28 shows a hardware configuration example including a data reading unit 2817 such as a scanner, and a data output unit 2818 such as a printer.

A central processing unit (CPU) 2801 is a controller that executes processing according to a computer program having written therein execution sequences of the modules, which have been described according to the exemplary embodiment, for example, the image processing module 100, the edge detection module 110, the straight-line-segment extraction module 120, the step-edge detection module 130, the straight-line-segment classification module 140, the near-color detection module 150, the quadrangle-candidate selection module 160, the maximum-quadrangle detection module 170, the shape correction module 180, the output module 190, the isolated-straight-line elimination module 2045, the near-color-threshold setting module 2355, and the control module 220.

A read only memory (ROM) 2802 stores a program and an arithmetic parameter that are used by the CPU 2801. A random access memory (RAM) 2803 corresponds to the above-described memory 230, and stores a program that is used when being executed by the CPU 2801, and a parameter that is properly changed when the program is executed. These units are connected to each other through a host bus 2804 formed of a CPU bus or the like.

The host bus 2804 is connected to an external bus 2806 such as a peripheral component interconnect/interface (PCI) bus through a bridge 2805.

A keyboard 2808 and a pointing device 2809 such as a mouse correspond to the above-described operation module 260, and are input devices that are operated by an operator. A display 2810 corresponds to the above-described display module 250, and may be a liquid crystal display or a cathode ray tube (CRT). The display 2810 displays various information in the form of text or image information.

A hard disk drive (HDD) 2811 has a hard disk therein, drives the hard disk, and records and reproduces a program executed by the CPU 2801 and information in and from the hard disk. The hard disk stores received images, final processing results, and intermediate processing results. Further, the hard disk stores various computer programs, such as other various data processing programs.

A drive 2812 reads data or a program recorded in a removable storage medium 2813, such as a magnetic disk, an optical disc, a magneto-optical disk, or a semiconductor memory mounted thereon. The drive 2812 supplies the data or the program to the RAM 2803 that is connected through an interface 2807, the external bus 2806, the bridge 2805, and the host bus 2804. The removable storage medium 2813 may be used as a data recording region similar to the hard disk.

A connection port 2814 is a port for connecting an external connection device 2815, and includes connection portions such as a USB and an IEEE-1394. The connection port 2814 is connected to the CPU 2801 through the interface 2807, the external bus 2806, the bridge 2805, and the host bus 2804. A communication unit 2816 corresponds to the above-described communication module 240. The communication unit 2816 is connected to a communication line, and executes data communication processing with respect to an external device. The data reading unit 2817 corresponds to the above-described image reception module 210. For example, the data reading unit 2817 is a scanner, and executes reading processing for a document. For example, the data output unit 2818 is a printer, and executes output processing for document data.

The hardware configuration of the image processing apparatus shown in FIG. 28 is merely a configuration example. The exemplary embodiment is not limited to the configuration shown in FIG. 28, and may have any configuration as long as the configuration may execute the modules which have been described according to the exemplary embodiment. For example, the modules may be partly formed of dedicated hardware (for example, an application specific integrated circuit (ASIC)). Alternatively, the modules may be partly provided in an external system, and may be connected through a communication line. Still alternatively, plural systems shown in FIG. 28 may be connected to each other through a communication line and may be operated in an associated manner. Further alternatively, the modules may be installed in a copier, a facsimile, a scanner, a printer, or a multi-function apparatus (an image processing apparatus having at least two functions of a scanner, a printer, a copier, and a facsimile).

Also, in the description of the exemplary embodiment, when comparison is made with a predetermined value, the wordings "equal to or larger than," "equal to or smaller than," "larger than," and "smaller (less) than" may be respectively changed to "larger than," smaller (less) than, "equal to or larger than," and "equal to or smaller than" unless a contradiction occurs in a combination.

The above-described various exemplary embodiments may be combined (for example, a module of an exemplary embodiment may be added to another exemplary embodiment, or a module of an exemplary embodiment may be replaced with a module of another exemplary embodiment). Also, a technique of related art may be employed as a processing content of a module.

The described program may be provided while being stored in a storage medium, or may be provided through a communication measure. In this case, the described program may be considered as a "computer readable storage medium storing a program."

The "computer readable storage medium storing a program" is a computer readable storage medium storing a program used for installation, execution, distribution, etc., of a program.

A storage medium may include, for example, a digital versatile disk (DVD), and more specifically "DVD-R, DVD-RW, DVD-RAM, etc." which are standards defined in the DVD forum and "DVD+R, DVD+RW, etc." which are standards defined according to DVD+RW; a compact disk (CD), and more specifically, a CD read-only memory (CD-ROM), a CD recordable (CD-R), a CD rewritable (CD-RW), etc.; a Blu-ray Disc (registered trademark); a magneto-optical disk (MO); a flexible disk (FD); a magnetic tape; a hard disk; a read only memory (ROM); an electrically erasable programmable read-only memory (EEPROM, registered trademark); a flash memory; a random access memory (RAM); a secure digital (SD) memory card; etc.

The program or part of the program may be stored in the storage medium, and may be kept or distributed. Alternatively, the program or part of the program may be transmitted through communication by a wired network, a wireless network, and a transmission medium with combination of a wired network and a wireless network, used for, for example, a local-area network (LAN), a metropolitan area network (MAN), a wide-area network (WAN), the Internet, an intranet, an extranet, etc. Still alternatively, the program or part of the program may be carried on a carrier wave.

Further, the program may be part of another program, or the program may be stored in a storage medium together with a different program. Further, the program may be divided and stored in plural storage media. Further, the program may be stored in any form, such as a compressed form or an encrypted form, as long as the program may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
   a first detection unit that detects boundaries from an image;
   an extraction unit that extracts straight-line segments from the boundaries detected by the first detection unit;
   a second detection unit that detects a region in which differences between pixel values of near pixels located across the straight-line segments extracted by the extraction unit are larger than a predetermined first value, or equal to or larger than the predetermined first value;
   a classification unit that classifies the straight-line segments in the region detected by the second detection unit into four sides of quadrangles;
   a third detection unit that detects colors or densities in outer areas of the four sides classified by the classification unit;
   a selection unit that selects combinations that differences between the colors or the densities detected by the third detection unit and corresponding to the straight-line segments in the combinations are equal to or smaller than a predetermined second value, or smaller than the predetermined second value, from the combinations of the four sides that possibly form the quadrangles;
   a fourth detection unit that detects coordinates of four vertexes obtained when the straight-line segments in the combinations are extended, and a combination that an area of a quadrangle formed by the corresponding four coordinates satisfies a predetermined condition, from the combinations selected by the selection unit; and
   a correction unit that corrects the quadrangle formed by the combination detected by the fourth detection unit to a rectangle.

2. The image processing apparatus according to claim 1, further comprising:
   an elimination unit that eliminates the straight-line segment of one side if distances between end points of the straight-line segment of the one side and end points of straight-line segments of two sides that may intersect with the one side are larger than a predetermined third value, or equal to or larger than the predetermined third value, from the straight-line segments classified into the four sides by the classification unit,
   wherein the third detection unit and the selection unit do not target the straight-line segment eliminated by the elimination unit.

3. The image processing apparatus according to claim 1, further comprising a setting unit that sets the predetermined second value that is used by the selection unit, in accordance with an operation by an operator who selects a change in color of a background region.

4. The image processing apparatus according to claim 1, wherein if a ratio of the area of the quadrangle formed by the selected combination to the image is equal to or smaller than a predetermined fourth value, or smaller than the predetermined fourth value, the selection unit changes the predetermined second value and executes the selection processing again.

5. The image processing apparatus according to claim 1, wherein the third detection unit detects colors or densities in outer areas near end points of the four sides, and
   wherein the selection unit targets the colors or the densities detected by the third detection unit, in outer areas near vertexes formed by two adjacent sides.

6. The image processing apparatus according to claim 5, wherein the third detection unit detects colors or densities in outer areas near three vertexes or near two diagonal vertexes.

7. A non-transitory computer readable medium storing a program causing a computer to provide functions for image processing, the functions comprising:
   a first detection unit that detects boundaries from an image;
   an extraction unit that extracts straight-line segments from the boundaries detected by the first detection unit;
   a second detection unit that detects a region in which differences between pixel values of near pixels located across the straight-line segments extracted by the extraction unit is larger than a predetermined first value, or equal to or larger than the predetermined first value;

a classification unit that classifies the straight-line segments in the region detected by the second detection unit into four sides of quadrangles;

a third detection unit that detects colors or densities in outer areas of the four sides classified by the classification unit;

a selection unit that selects combinations that differences between the colors or the densities corresponding to the straight-line segments in the combinations are equal to or smaller than a predetermined second value, or smaller than the predetermined second value, from the combinations of the four sides that possibly form the quadrangles;

a fourth detection unit that detects coordinates of four vertexes obtained when the straight-line segments in the combinations are extended, and a combination that an area of a quadrangle formed by the corresponding four coordinates satisfies a predetermined condition, from the combinations selected by the selection unit; and a correction unit that corrects the quadrangle formed by the combination detected by the fourth detection unit to a rectangle.

8. An image processing method, comprising:

controlling at least one processor to execute operations comprising:

detecting boundaries from an image;

extracting straight-line segments from the boundaries;

detecting a region in which differences between pixel values of near pixels located across the straight-line segments are larger than a predetermined first value, or equal to or larger than the predetermined first value;

classifying the straight-line segments in the region into four sides of quadrangles;

detecting colors or densities in outer areas of the four sides;

selecting combinations that differences between the colors or the densities and corresponding to the straight-line segments in the combinations are equal to or smaller than a predetermined second value, or smaller than the predetermined second value, from the combinations of four sides that possibly form the quadrangles;

detecting a combination that coordinates of four vertexes obtained when the straight-line segments in the combination are extended, and an area of a quadrangle formed by the corresponding four coordinates satisfies a predetermined condition, from the combinations; and correcting the quadrangle formed by the combination to a rectangle.

\* \* \* \* \*